United States Patent
Katagiri

(10) Patent No.: US 6,927,398 B2
(45) Date of Patent: Aug. 9, 2005

(54) TWO-DIMENSIONAL RADIATION AND NEUTRON IMAGE DETECTORS

(75) Inventor: Masaki Katagiri, Mito (JP)

(73) Assignee: Japan Atomic Energy Research Institute, Tokyo (JP)

( * ) Notice: Subject to any disclaimer, the term of this patent is extended or adjusted under 35 U.S.C. 154(b) by 0 days.

(21) Appl. No.: 10/824,499

(22) Filed: Apr. 15, 2004

(65) Prior Publication Data

US 2004/0188629 A1 Sep. 30, 2004

Related U.S. Application Data

(63) Continuation of application No. 09/940,449, filed on Aug. 29, 2001.

(30) Foreign Application Priority Data

Aug. 29, 2000 (JP) ..................... 2000-259443

(51) Int. Cl.[7] .............................. G01T 3/06
(52) U.S. Cl. .................. 250/390.11; 250/367; 250/368
(58) Field of Search ............................ 250/361 R, 362, 250/363.01, 367, 368, 390.11

(56) References Cited

U.S. PATENT DOCUMENTS

| | | | | |
|---|---|---|---|---|
| 4,713,198 A | * | 12/1987 | Simonetti | 252/301.17 |
| 5,313,064 A | * | 5/1994 | Fujii | 250/361 R |
| 5,714,761 A | | 2/1998 | Fay | |
| 5,783,829 A | | 7/1998 | Sealock et al. | |
| 6,066,851 A | | 5/2000 | Madono et al. | |
| 6,078,052 A | | 6/2000 | DiFilippo | |
| 6,298,113 B1 | | 10/2001 | Duclos et al. | |
| 6,563,121 B1 | | 5/2003 | Schreiner et al. | |

FOREIGN PATENT DOCUMENTS

| JP | 3-29256 A | * | 2/1991 | .......... H01J/37/244 |
|---|---|---|---|---|
| JP | 2000-187077 A | | 4/2000 | |

OTHER PUBLICATIONS

Kei–Ichi Kuroda. et. al. "*Poissonian–type new radiation imager*" Nuclear Instruments and Methods in Physics Research A 430; 311–320 (1999).

* cited by examiner

*Primary Examiner*—Constantine Hannaher
(74) *Attorney, Agent, or Firm*—Banner & Witcoff, Ltd.

(57) ABSTRACT

A [6]Li doped glass scintillator sheet with grooves cut at given spacings in horizontal and vertical directions. Bundles of wavelength shifting fibers placed in the vertical grooves and fluorescence reflector buried in the horizontal grooves make a group of detection pixels. Neutron detecting media are provided on the top surface and bundles of wavelength shifting fibers are arranged horizontally on the bottom surface of the scintillator. Fluorescence generated by stimulation with the neutrons entering the detection pixels and with the neutrons incident on the neutron detecting media are detected by the wavelength shifting fibers. The detected fluorescence is converted to electric signals with a multi-channel photomultiplier tube, with pulse signals for simultaneous counting generated from a retriggerable, constant time-duration pulse generator and recorded as time-series data by parallel interfaces. The recorded data are analyzed by the simultaneous counting method to produce a two-dimensional neutron image.

5 Claims, 32 Drawing Sheets

Fig. 5
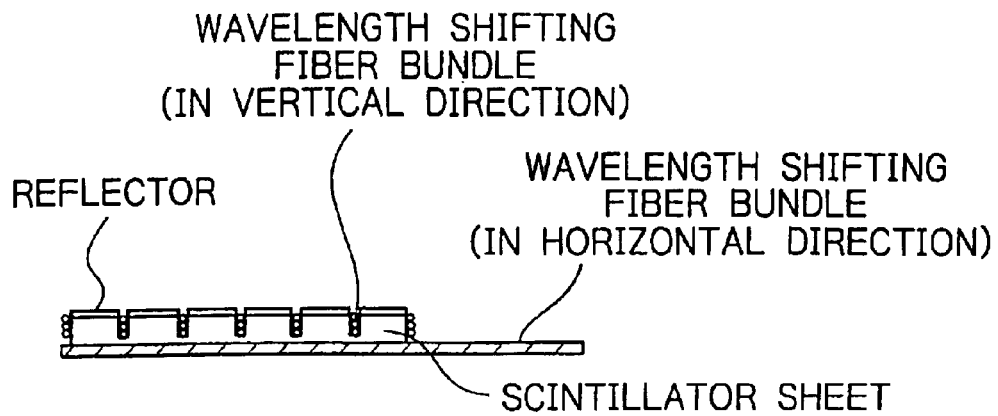
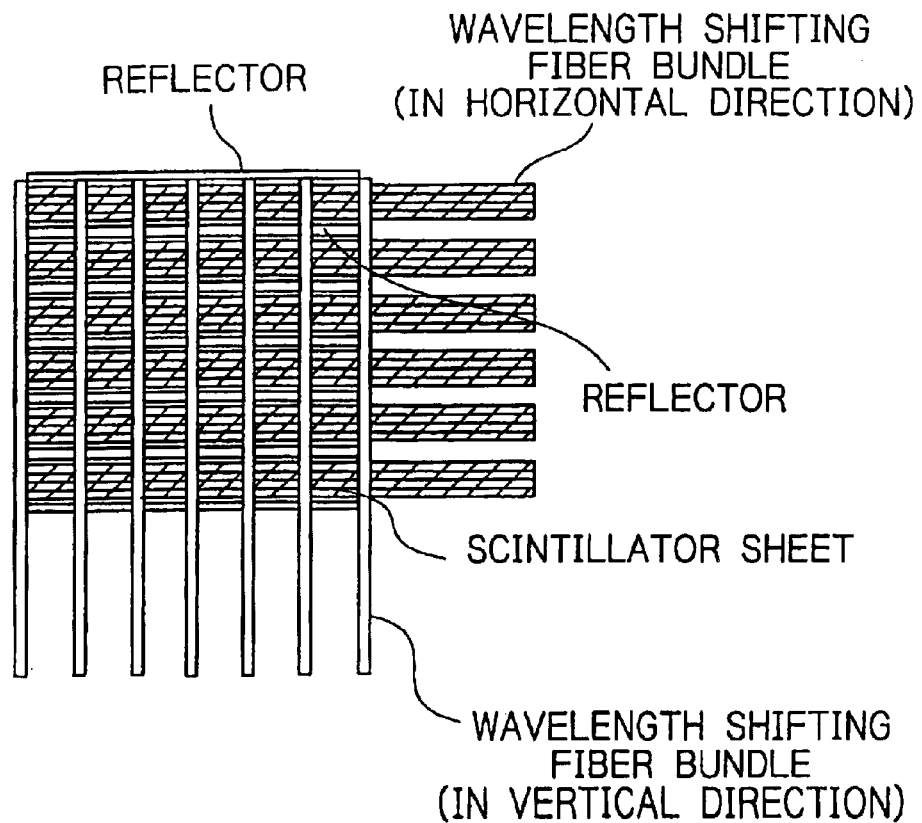

Fig. 6
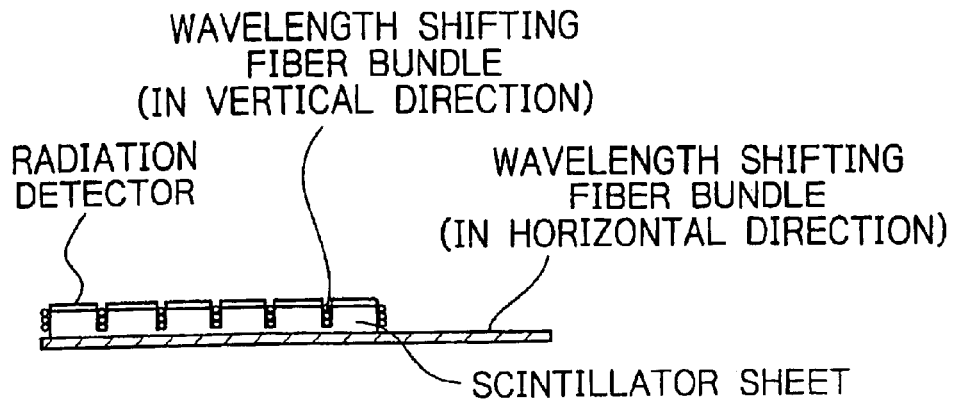
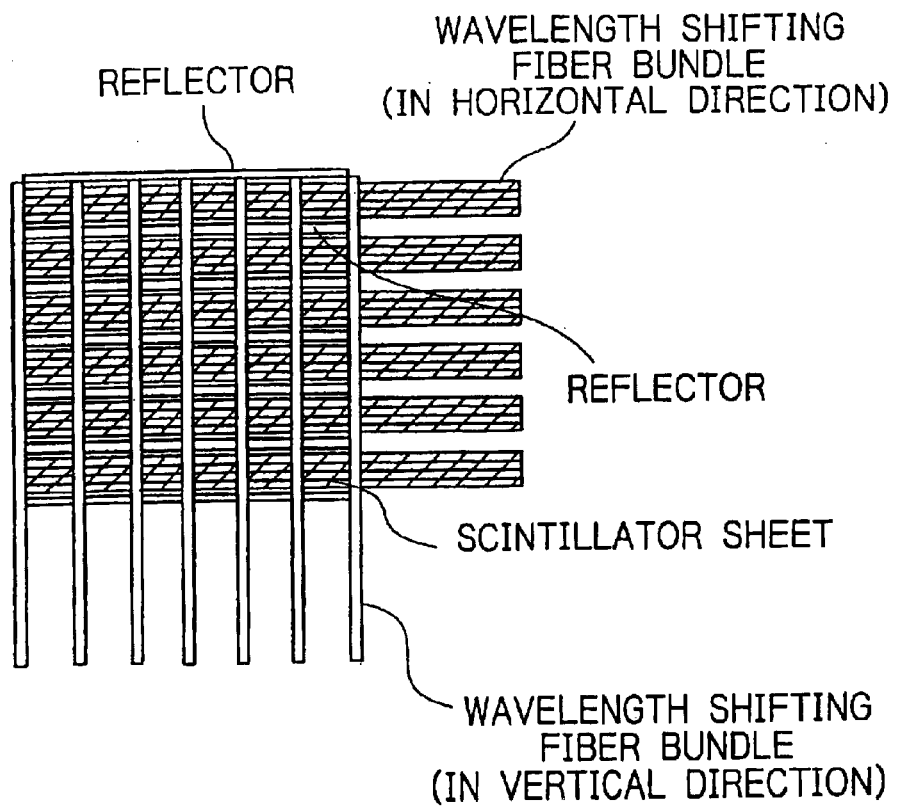

Fig. 7

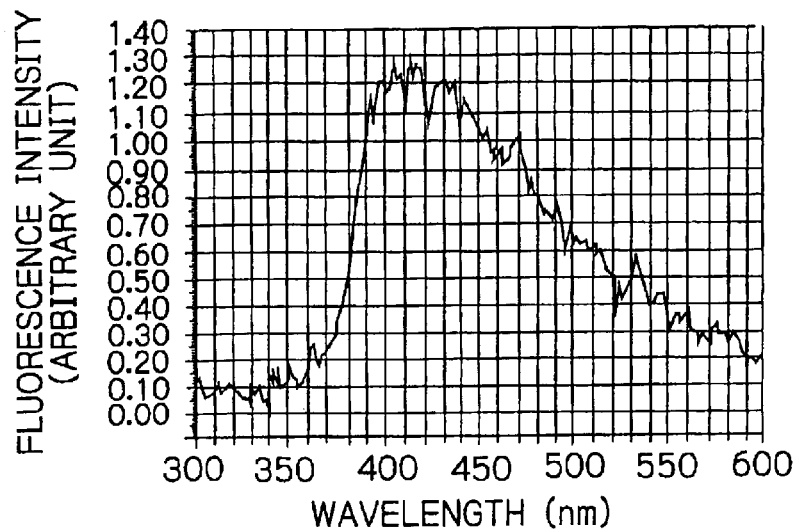

FLUORESCENCE SPECTRUM OBTAINED WHEN THE FLUORESCENCE EMITTED FROM PHOSPHOR $Y_2SiO_5$:CE UPON $\alpha$-RAY STIMULATION WAS DETECTED THROUGH A SCINTILLATOR ON THE LATERAL SIDE

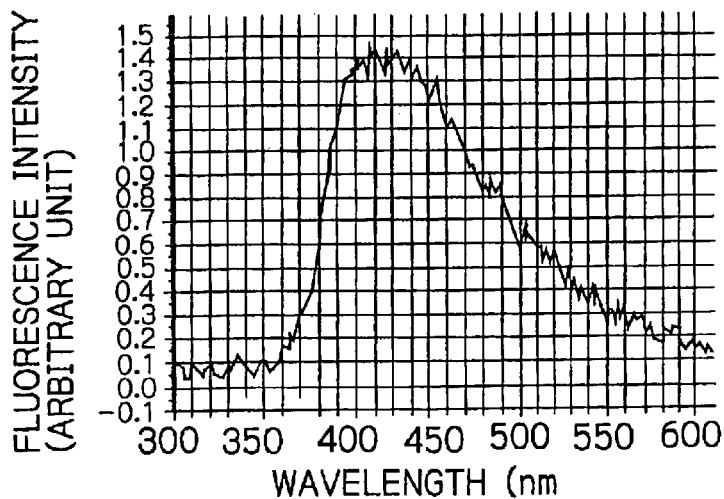

FLUORESCENCE SPECTRUM (COMPARISON) OBTAINED WHEN THE FLUORESCENCE EMITTED FROM PHOSPHOR $Y_2SiO_5$:CE UPON $\alpha$-RAY STIMULATIO WAS DETECTED THROUGH A SCINTILLATOR ON THE BACK SIDE Fig. 8
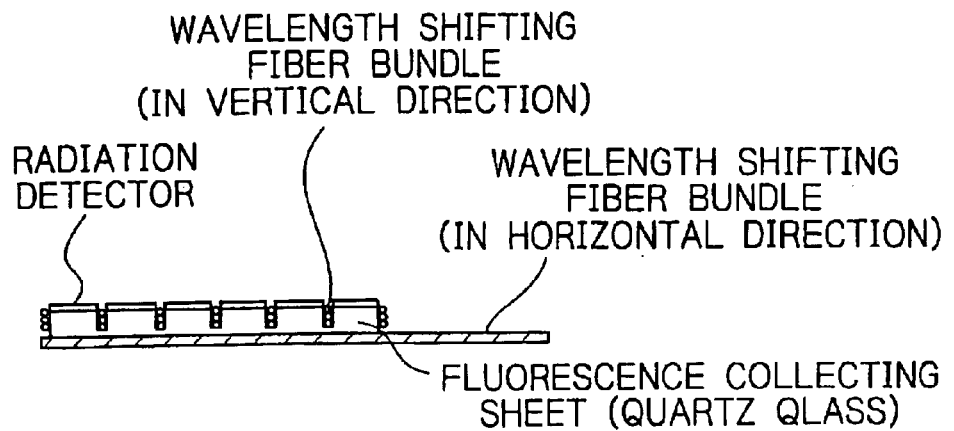
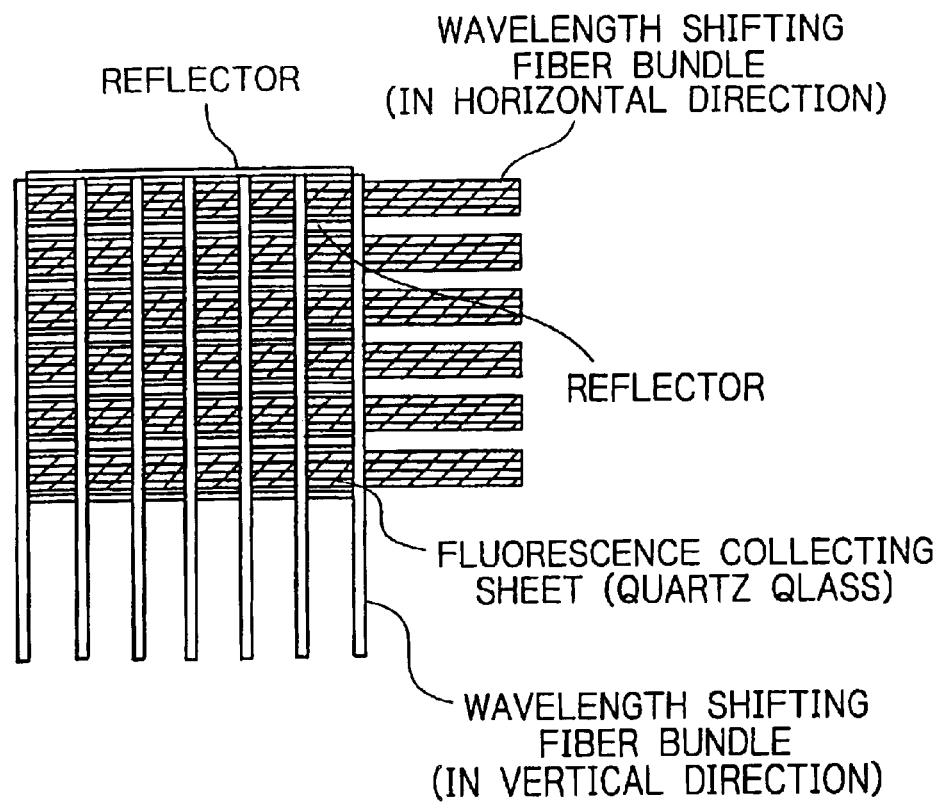

FLUORESCENCE SPECTRUM OBTAINED WHEN THE
FLUORESCENCE EMITTED FROM PHOSPHOR
$Y_2SIO_5$ : CE UPON $\alpha$-RAY STIMULATION WAS
DETECTED THROUGH A FLUORESCENCE COLLECTOR
QUARTZ GLASS ON THE LATERAL SIDE FLUORESCENCE SPECTRUM OBTAINED WHEN THE FLUORESCENCE EMITTED FROM PHOSPHOR $Y_2SIO_5$:CE UPON $\alpha$-RAY STIMULATION WAS DETECTED THROUGH A FLUORESCENCE COLLECTOR WAVELENGTH SHIFTER ON THE LATERAL SIDE (AFTER WAVELENGTH CONVERSION TO 435 NM)

Fig. 13
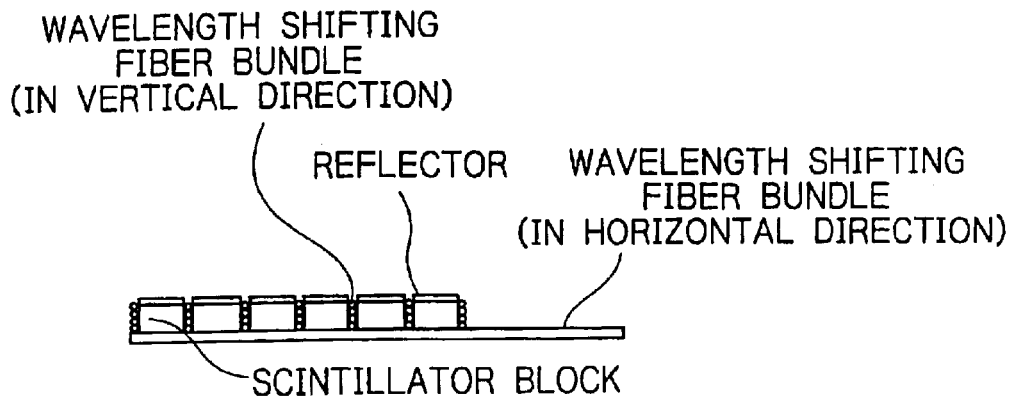
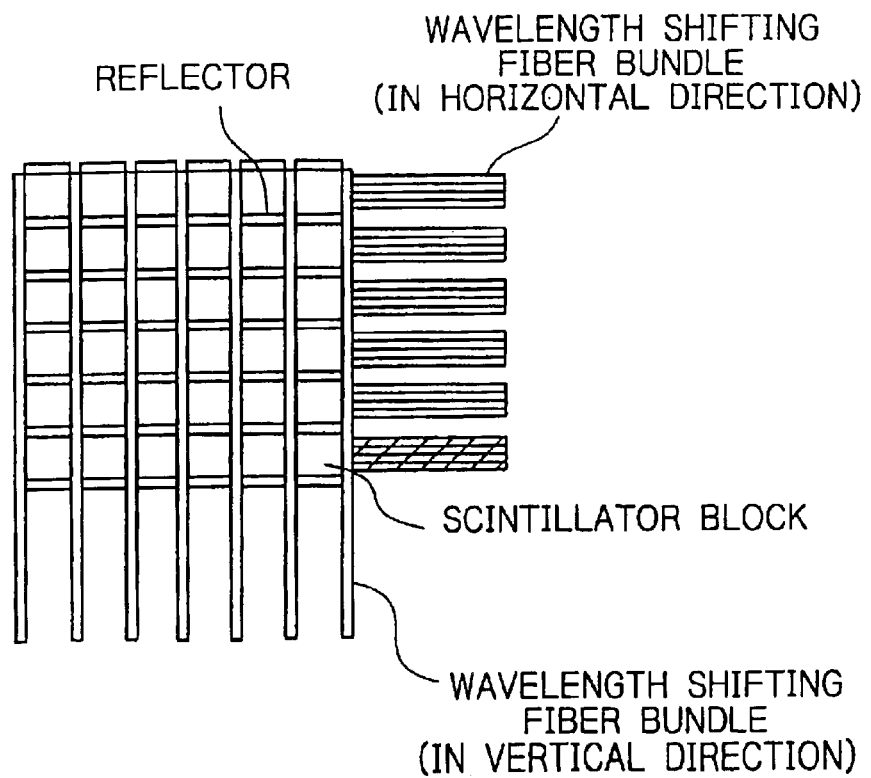

TWO-DIMENSIONAL RADIATION AND NEUTRON IMAGE DETECTORS

This application claims the benefit under 35 U.S.C. § 120 and 119(a) of prior filed U.S. application Ser. No. 09/940,449, filed Aug. 29, 2001, the entirety of which is hereby incorporated by reference, and foreign priority of Japan application no. 259443/2000 filed Aug. 29, 2000.

BACKGROUND OF THE INVENTION

This invention relates to a detector for obtaining two-dimensional radiation image using a scintillator and a phosphor as radiation detecting medium. The detector is characterized in that by combining a scintaillator and phosphor of short fluorescence life with wavelength shifting fibers, two-dimensional radiation image can be detected at high speed and with good positional precision even if the incident radiation has high flux. If combined with a neutron converter, the detector is also capable of two-dimensional neutron imaging and hence is used for studies in materials physics and structural biology by neutron scattering in nuclear reactors and accelerators or X-ray scattering with synchrotron radiation, for medical X-ray diagnosis using X-ray generator and accelerator, and for autoradiography using X-rays or neutrons. The detector is also used in understanding dynamic events through fast processed and real-time radiation image detection with a radiation image detector for studies in high-energy physics using an accelerator, as well as in a function apparatus for monitoring the distribution of radiations including neutrons generated in nuclear reactors and fusion reactors.

The two-dimensional radiation image detector has been used to determine the position of entrance of a radiation into a scintillator or a phosphor by detecting the emitted fluorescence with bundles of optical fibers such as wavelength shifting fibers arranged in a grid pattern in both a horizontal and a vertical direction. In the case of a detector using scintillators, one pixel need be formed by one scintillator as shown in FIG. 31 [K. Kuroda et al., Nucl. Instr. and Meth. A430 (1999) 311–320] or FIG. 32 (Masaki Katagiri, JPA 2000-187077), so scintillators of a comparatively large size have been used to construct a two-dimensional radiation image detector that has a positional resolution of at least about 5 mm and which has a comparatively large area.

In the case of phosphors, a thin fluorescent sheet is used and detection is realized by bundles of optical fibers such as wavelength shifting fibers arranged in a grid pattern in both a horizontal and a vertical direction, so in order to enhance the detection efficiency of fluorescence, the distance between adjacent bundles of optical fibers has to be shortened; hence, the use of phosphors has been limited to a two-dimensional radiation image detector that has a positional resolution of no more than about 2 mm and which has a comparatively small area.

In either type of detector, scintillators or phosphors having short fluorescence life are used and detection is realized by using optical fibers such as wavelength shifting fibers arranged in a grid pattern in both a horizontal and a vertical direction, so except for some phosphors such as ZnS:Ag that emit a large amount of fluorescence, no more than several tens of photons reach the photodetector. Therefore, utilizing the emission of fluorescence that occurs upon incidence of radiation according to the Poisson distribution, K. Kuroda et al. have proposed a method by which the fluorescence from horizontal and vertical wavelength shifting fibers is converted to a two-dimensional image by a signal processing system comprising a photomultiplier tube, an amplifier circuit for amplifying the output signal, a peak height discriminating circuit for determining signal timing, a circuit for generating pulses of a specified time duration, and a coincidence circuit [K. Kuroda et al., Nucl. Instr. and Meth. A430(1999) 311–320]. In this method, in order to assure the desired minimum efficiency of simultaneous detection, the coincidence time which is set to perform simultaneous counting of signals corresponding to the horizontal and vertical directions has been chosen at specified values at least twice as much as the fluorescence life.

SUMMARY OF THE INVENTION

An object of the present invention is provide a two-dimensional radiation image detector that uses optical fibers such as wavelength shifting fibers in combination with scintillators or phosphors to detect signal for producing a two-dimensional radiation image and which can be easily fabricated by overcoming the difficulties encountered in the prior art in mounting a number of small scintillators in a plane.

Another object of the invention is to provide a two-dimensional radiation image detector that uses large pixels and which overcomes the difficulties encountered in applying phosphors such as a phosphor sheet.

Yet another object of the invention is to provide a two-dimensional image detector that uses the scintillator and the phosphor in combination as the radiation detecting medium to improve the detection efficiency by overcoming the difficulty in increasing the thickness of the detection medium.

A further object of the invention is to enhance the count rate of a two-dimensional radiation image detector that uses a scintillator or phosphor of short fluorescence life and which performs photon detection on the emitted fluorescence with optical fibers such as wavelength shifting fibers arranged in a grid pattern in both a vertical and a horizontal direction.

A still further object of the invention is to provide a detector that enables fast and easy detection of two-dimensional images of not only a radiation but also neutrons.

These objects of the invention can be attained by a two-dimensional radiation image detector using the scintillator which is characterized in that grooves are cut in a scintillator sheet of large area in both a horizontal and a vertical direction at spacings of given pixel size and that a fluorescence reflector such as MgO or a material that not only reflects fluorescence but also has high gamma-ray absorbance or a material that not only reflects fluorescence but also has a large neutron absorption cross section is buried in the grooves to prevent inter-pixel leakage of fluorescence while improving the efficiency of fluorescence emission at the fluorescence detecting surfaces and enhance the position detecting performance for gamma-rays or neutrons through the use of the material having great ability to absorb gamma-rays or neutrons. By placing optical fibers such as wavelength shifting fibers within the grooves, fluorescence can be read from the lateral sides of the pixels and this enables the detection of multi-functional radiation image.

To fabricate a two-dimensional radiation image detector using the phosphor, transparent blocks or wavelength shifting blocks or scintillator blocks are used as fluorescence collecting substrates and optical fibers such as wavelength shifting fibers are placed on the lateral sides of the substrates for fluorescence detection as in the prior art.

By designing a structure in which the phosphor can be used in combination with the scintillator to make the radiation detecting medium, the detection efficiency can be improved even if it is difficult to increase the thickness of the phosphor.

In the case of a two-dimensional radiation image detector that uses a scintillator or phosphor having short fluorescence life and which detects the emitted fluorescence with optical fibers such as wavelength shifting fibers arranged in a grid pattern in both a horizontal and a vertical direction, a radiation image is constructed on the basis of the output photon detection signals for both horizontal and vertical directions. If pulse signals whose time duration is determined on the basis of the Poisson distribution in correspondence with the fluorescence life of the detection medium are generated from a retriggerable pulse signal generator that generates retriggerable pulses in response to a timing pulse signal output from a peak height discriminator, these pulse signals can be used to determine a two-dimensional radiation image in higher count rate by the simultaneous counting technique.

If desired, $^6$Li, $^{10}$B and Gd which are neutron converters that convert neutrons to ionizable radiation may be contained either alone or in admixture or in combination within the detection medium to make a neutron detecting medium which can be used to obtain two-dimensional neutron image.

BRIEF DESCRIPTION OF THE DRAWINGS

FIG. 5 shows another exemplary two-dimensional radiation image detector that uses a scintillator sheet as a substrate and which produces a two-dimensional radiation image by detecting the fluorescence from the scintillator with bundles of wavelength shifting fibers placed in grooves formed in the top surface of the scintillator sheet in both a horizontal and a vertical direction and bundles of wavelength shifting fibers arranged on the bottom surface of the scintillator sheet;

FIG. 6 shows another exemplary two-dimensional radiation image detector that uses a scintillator sheet as a substrate and which produces a two-dimensional radiation image by detecting the fluorescence from radiation detecting mediums placed on the top surface of the scintillator sheet and from the scintillator using bundles of wavelength shifting fibers placed in grooves formed in the top surface of the scintillator sheet in both a horizontal and a vertical direction and bundles of wavelength shifting fibers arranged on the bottom surface of the scintillator sheet;

FIG. 7 shows in the upper section the fluorescence spectrum obtained when the fluorescence emitted upon a-ray stimulation from the phosphor $Y_2SiO_5$:Ce placed on the top surface of a Li glass scintillator was detected through it on the lateral side, as compared with the result of measurement on its back side which is shown in the lower section;

FIG. 8 shows another exemplary two-dimensional radiation image detector that uses a fluorescence collecting quartz glass sheet as a substrate and which produces a two-dimensional radiation image by detecting the fluorescence from the quartz glass using bundles of wavelength shifting fibers placed in grooves formed in the top surface of the quartz glass sheet in a vertical direction and bundles of wavelength shifting fibers arranged on the bottom surface of the quartz glass sheet;

FIG. 13 shows another exemplary two-dimensional radiation image detector that produces a two-dimensional radiation image by detecting the fluorescence from a scintillator using bundles of wavelength shifting fibers arranged in a horizontal direction on both the top and bottom surfaces of rectangular scintillator blocks arranged in a plane and bundles of wavelength shifting fibers arranged in a vertical direction on the lateral sides of the scintillator blocks;

DETAILED DESCRIPTION OF THE INVENTION

Conventionally, the two-dimensional radiation image detector using a scintillator has taken much trouble to produce since a number of scintillator blocks need be arranged. In the present invention, production is made easier by making grooves in a scintillator sheet of large area. By fitting the lateral sides with a material that not only reflects fluorescence but also absorbs gamma-rays or neutrons, the efficiency of fluorescence emission at the fluorescence detecting surfaces can be enhanced while at the same time the position detecting performance for gamma-rays or neutrons can be improved. In addition, by reading fluorescence from the lateral sides of pixels, multi-functional detection of radiation image can be realized.

In the case of a two-dimensional radiation image detector using a phosphor, a transparent substrate or a wavelength shifter substrate or a scintillator sheet or the like is used as a substrate for reading out fluorescence and this enables the production of a large-area two-dimensional radiation image detector having an unconventionally large area.

By adopting a structure that permits the combined use of a phosphor and a scintillator, a radiation image detector can be realized that has an improved detection efficiency or which is multi-functional.

In the case of constructing a radiation image on the basis of the output photon detection signals for both horizontal and vertical directions, pulse signals whose time duration is determined on the basis of the Poisson distribution in correspondence with the fluorescence life of the detection medium are generated from a retriggerable pulse signal generator that generates retriggerable pulses in response to a timing pulse signal output from a peak height discriminator and these pulse signals are used to determine a two-dimensional radiation image by the simultaneous counting technique. The time duration of pulses that are used in the simultaneous counting technique can be made shorter than when the conventional pulse generator of a constant time duration is used, so higher count rates can be achieved.

If the scintillator or phosphor is used in combination with a neutron converter, a two-dimensional neutron image can be realized.

EXAMPLE 1

Figure 1:
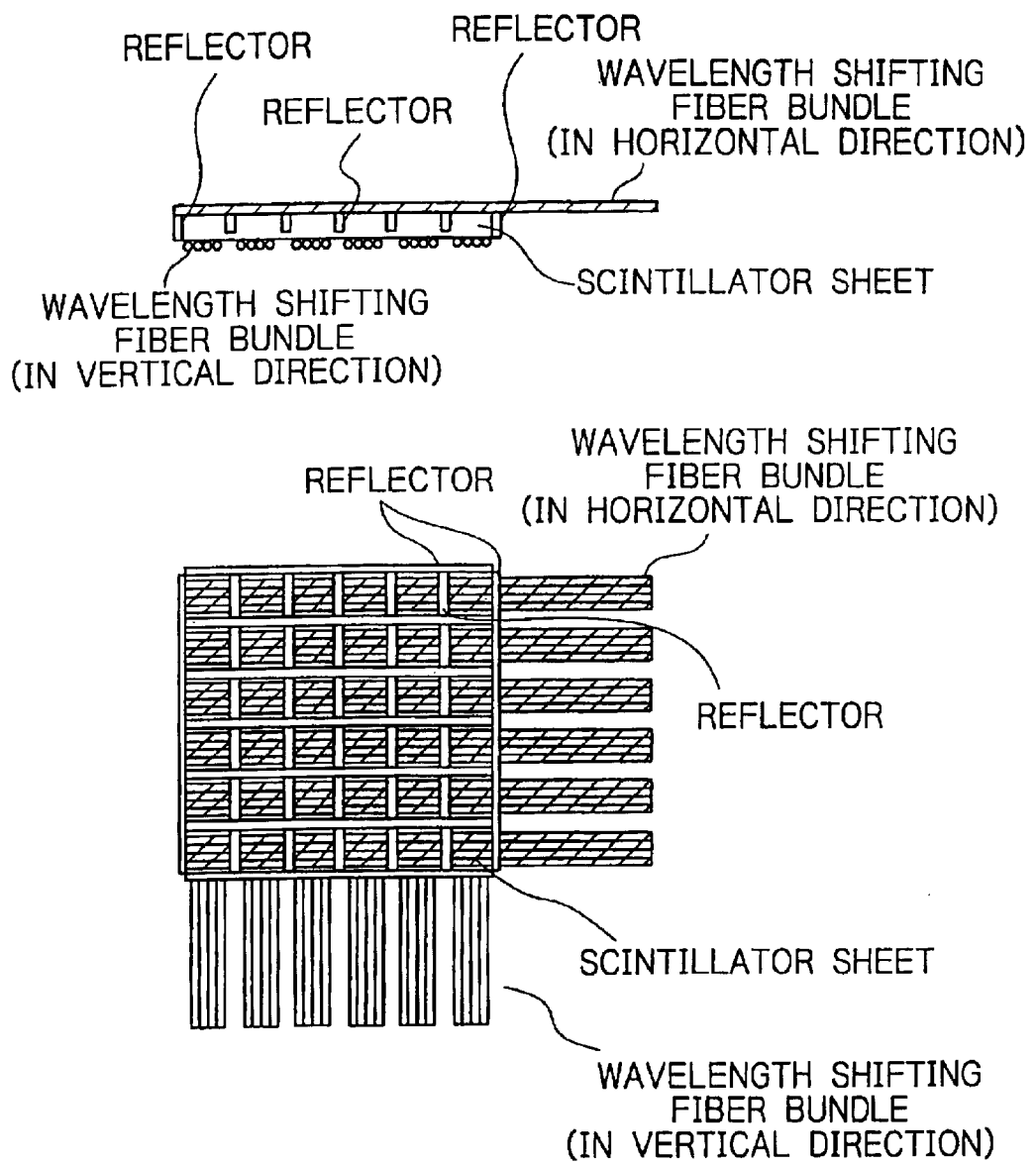
FIG. 1 shows an exemplary two-dimensional radiation image detector which uses a scintillator sheet as a substrate and which is composed of a group of detection pixels created in the substrate by dividing it with a fluorescence reflector buried in grooves formed in its top surface in both a horizontal and a vertical direction.

A two-dimensional radiation image detector according to Example 1 of the invention is described below with reference to FIG. 1. This embodiment is characterized by the following: the top surface of a scintillator sheet which generates fluorescence upon incidence of a radiation has grooves cut at predetermined spacings in a horizontal and a vertical direction to a depth at least one half the thickness of the scintillator sheet and a fluorescence reflector is buried in the grooves to make a group of detection pixels that are separated by the horizontal and vertical grooves, and the fluorescence generated by stimulation with the radiation launched into the detection pixels is detected to produce a two-dimensional radiation image.

The scintillator sheet that can be used as the substrate of the two-dimensional radiation image detecting medium may be BC-412, the plastic scintillator of Bicron, USA, which has heretofore been used as a medium for detecting ionizing radiations such as X-rays or α-rays. This scintillator emits fluorescence with a life of 3.3 ns at a wavelength of 434 nm. In the example, the scintillator sheet is sized 100 mm on each side and 2 mm in thickness. Using a diamond cutter or the like, grooves 0.5 mm wide and 1.5 mm deep are formed in the scintillator sheet at a spacing of 2 mm in both the horizontal and vertical directions. A conventionally used fluorescence reflector such as $Al_2O_3$ or MgO is buried in the grooves to make a group of detection pixels separated by the horizontal and vertical grooves. Since the grooves are formed to a depth at least one half the thickness of the scintillator sheet, there is little deterioration in positional resolution that may be caused by the leakage of fluorescence from one detection pixel to another.

As in the prior art, optical fiber bundles are placed on both surfaces of the two-dimensional radiation image detecting medium, the bundles on the top surface in a horizontal direction and those on the bottom surface in a vertical direction so that they are arranged in a grid pattern, and the simultaneous counting method is applied to the fluorescence entering the detection pixels after being generated by stimulation with a radiation. In this way, the two-dimensional radiation image detector of the embodiment under consideration is fabricated. The optical fiber bundles may be composed of wavelength shifting fiber BCF-92 of Bicron, USA which matches the fluorescence wavelength of the plastic scintillator BC-412. In order to increase the efficiency of fluorescence detection by the wavelength shifting fibers, the fluorescence reflector is placed on their end faces that are not connected to a photodetector. This method can achieve an improvement of at least several tens of percent in detection efficiency. In FIG. 1, the wavelength shifting fibers are grouped in bundles that correspond to pixels but there is no problem if they are arranged continuously. In this alternative case, the wavelength shifting fibers between detection pixels may be so adapted that they are not connected to a photodetector. The efficiency of fluorescence detection by the wavelength shifting fibers may be slightly increased by placing the fluorescence reflector at their back surfaces.

Exemplary scintillator sheets that may be used as the substrate of the two-dimensional radiation image detecting medium include a glass scintillator, a CsI scintillator, a YAlO$_3$:Ce scintillator and a GSO scintillator. The optical fiber bundles may also be composed of "side entrance" optical fibers which are ground into the core in selected areas of the lateral side to permit side entrance of incident light.

EXAMPLE 2

Figure 2:
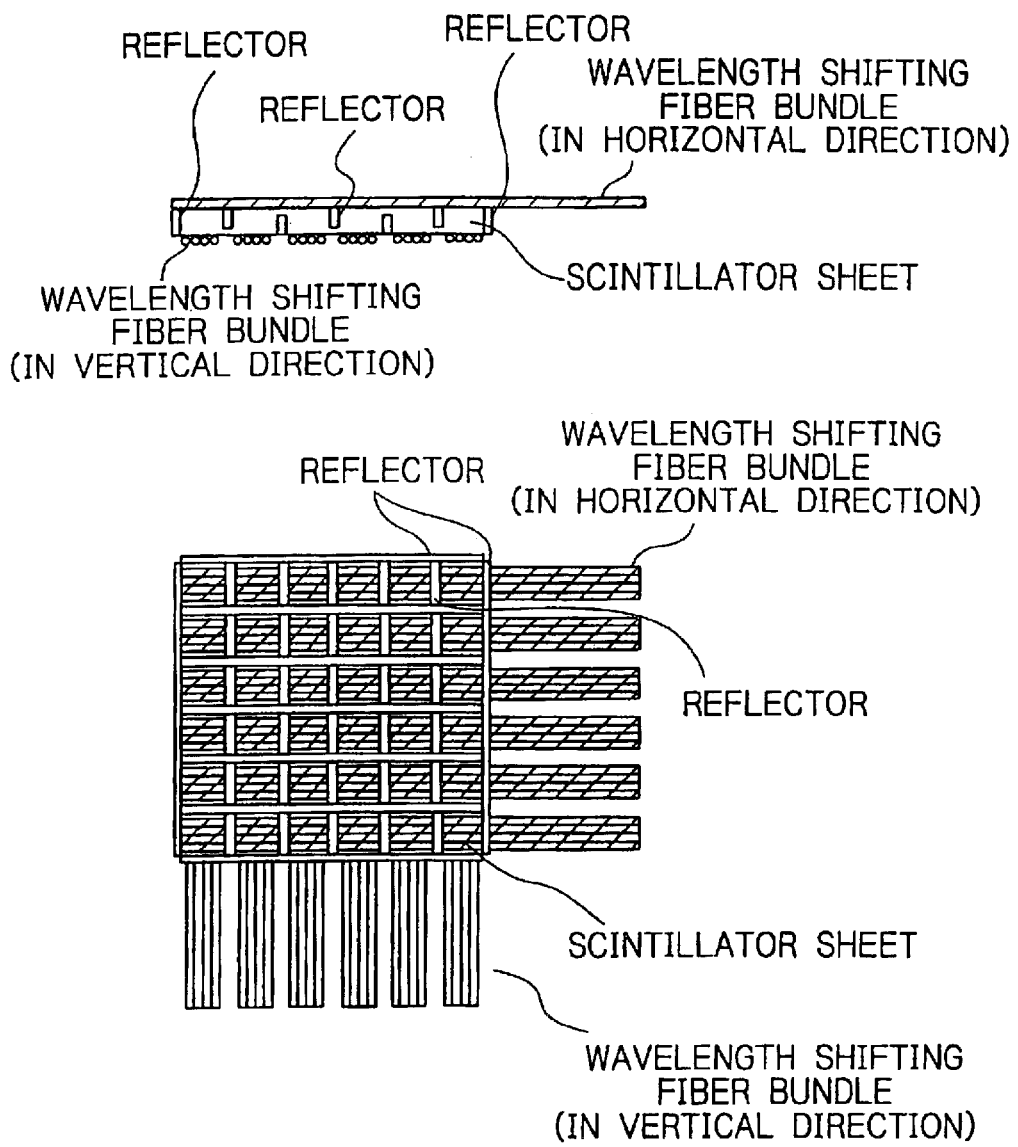
FIG. 2 shows another exemplary two-dimensional radiation image detector which uses a scintillator sheet as a substrate and which is composed of a group of detection pixels created in the substrate by dividing it with a fluorescence reflector buried in grooves formed alternately in its top and bottom surfaces in both a horizontal and a vertical direction.

A two-dimensional radiation image detector according to Example 2 of the invention is described below with reference to FIG. 2. This embodiment is characterized by the following: the top and bottom surfaces of a scintillator sheet which generates fluorescence upon incidence of a radiation are alternately provided with grooves that are cut at predetermined spacings in a horizontal and a vertical direction to a depth at least one half the thickness of the scintillator sheet and a fluorescence reflector is buried in the grooves to make a group of detection pixels that are separated by the horizontal and vertical grooves, and the fluorescence generated by stimulation with the radiation launched into the detection pixels is detected to produce a two-dimensional radiation image.

As in Example 1, the plastic scintillator BC-412 may be used as the two-dimensional radiation image detecting medium. The scintillator sheet is sized 100 mm on each side and 2 mm in thickness. Using a diamond cutter or the like, grooves 0.5 mm wide and 1.5 mm deep are formed alternately in the top and bottom surfaces of the scintillator sheet in both the horizontal and vertical directions. A conventionally used fluorescence reflector such as Al$_2$O$_3$ or MgO is buried in the grooves to make a group of detection pixels separated by the horizontal and vertical grooves formed alternately in the top and bottom surfaces of the scintillator sheet. The thus prepared two-dimensional radiation image detecting medium may be processed as in the prior art (see FIG. 1) to fabricate the two-dimensional radiation image detector of the invention.

EXAMPLE 3

Figure 3:
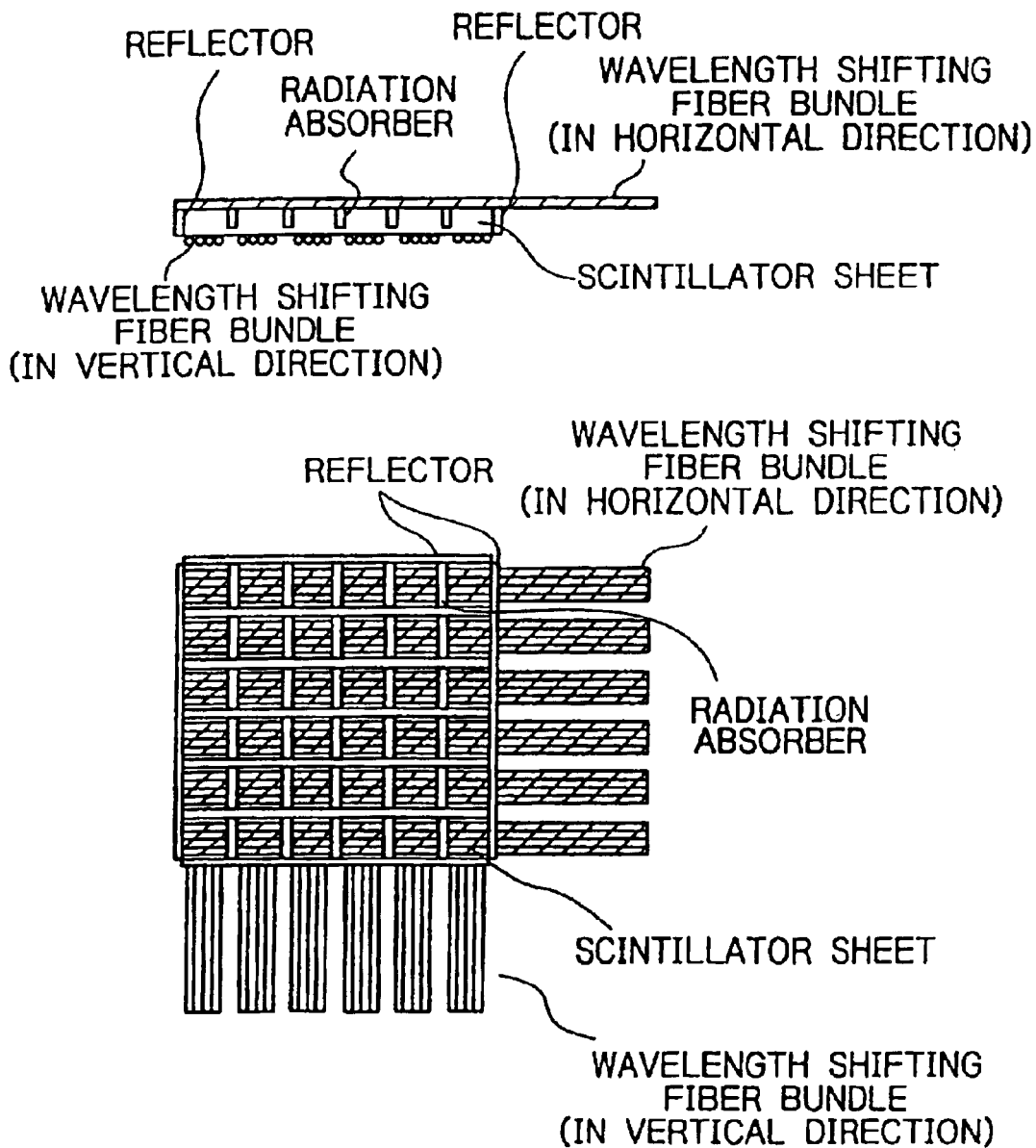
FIG. 3 shows another exemplary two-dimensional radiation image detector which uses a scintillator sheet as a substrate and which is composed of a group of detection pixels created in the substrate by dividing it with a radiation absorber buried in grooves formed in its top surface in both a horizontal and a vertical direction.

A two-dimensional radiation image detector according to Example 3 of the invention is described below with reference to FIG. 3. In this embodiment, a two-dimensional radiation image detecting medium is prepared by the same method as in Example 1 or 2, except that a two-dimensional radiation image is obtained by using a reflector that has a significant radiation shielding effect to isolate radiation between detection pixels.

If desired, the powder of silver or like elements that have atomic numbers of 40 or more and which are adequately white to serve as a fluorescence reflector may be buried in the grooves in the two-dimensional radiation detecting medium to isolate radiation between detection pixels so that a collimating effect is provided to produce better performance in position detection.

EXAMPLE 4

Figure 4:
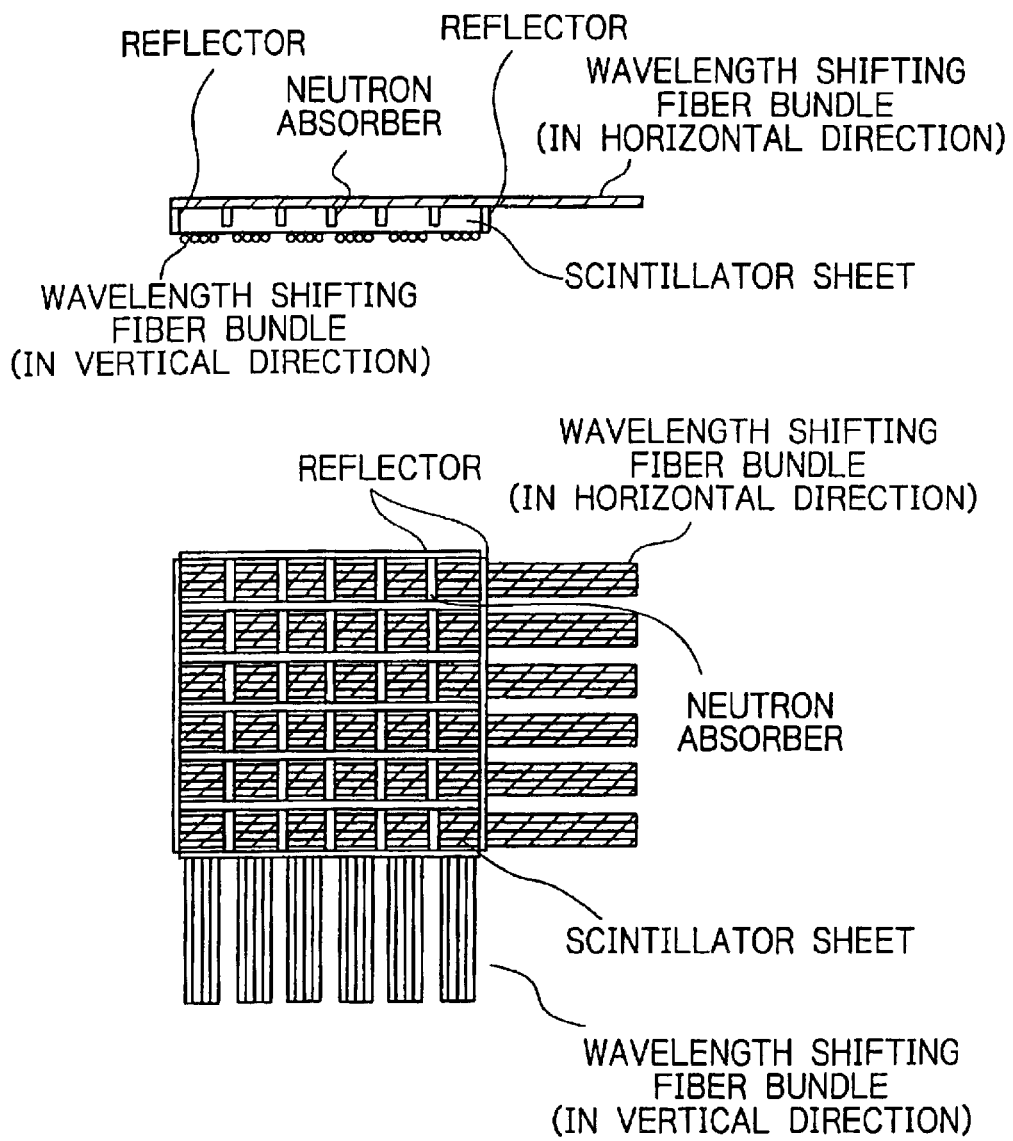
FIG. 4 shows an exemplary two-dimensional neutron image detector which uses a neutron converter containing scintillator sheet as a substrate and which is composed of a group of detection pixels created in the substrate by dividing it with a neutron absorber buried in grooves formed in its top surface in both a horizontal and a vertical direction.

A two-dimensional neutron image detector according to Example 4 of the invention is described below with reference to FIG. 4. This embodiment is characterized in that a material containing at least one of $^6$Li, $^{10}$B and Gd which are neutron converters is used as the scintillator sheet, which is processed as in Example 1 or 2 to prepare a two-dimensional neutron image detecting medium except that a two-dimensional neutron image is obtained by using a reflector that has a significant neutron shielding effect to isolate neutrons between detection pixels. In this embodiment, a $^6$Li glass scintillator containing 6.6% of neutron converter $^6$Li and which is available from Bicron under the trade name GS20 is used as the scintillator sheet. This scintillator emits fluorescence with a life of 60 ns at a wavelength of 390 nm. If desired, Gd$_2$O$_3$ which contains an element that has a large neutron absorption cross section and which is adequately white to serve as a fluorescence reflector may be buried in the grooves in the two-dimensional neutron detecting medium to isolate neutrons between detection pixels so that a collimating effect is provided to produce better performance in position detection.

EXAMPLE 5

A two-dimensional radiation image detector according to Example 5 of the invention is described below with reference to FIG. 5. This embodiment is characterized by the following: the top surface of a scintillator sheet which generates fluorescence upon incidence of a radiation has grooves cut at predetermined spacings in a horizontal and a vertical direction to a depth at least one half the thickness of the scintillator sheet, with optical fiber bundles being placed in the vertical grooves and a fluorescence reflector buried in the horizontal grooves, and optical fiber bundles are arranged on either the top or the bottom surface of the scintillator sheet or on both surfaces in a transverse direction normal to the optical fiber bundles within the vertical grooves to make a group of detection pixels that are separated by the horizontal and vertical grooves, and the fluorescence generated by stimulation with the radiation launched into the detection pixels is detected by the optical fiber bundles placed within the vertical grooves in the scintillator sheet and the optical fiber bundles arranged on either the top or the bottom surface of the scintillator sheet or on both surfaces, thereby producing a two-dimensional radiation image.

The scinitillator sheet that can be used as the substrate of the two-dimensional radiation image detecting medium may be BC-412, the plastic scintillator of Bicron, USA. This emits fluorescence with a life of 3.3 ns at a wavelength of 434 nm. In the example, the scintillator sheet is sized 200 mm on each side and 2 mm in thickness. Using a diamond cutter or the like, grooves 0.6 mm wide and 1.5 mm deep are formed in the scintillator sheet at a spacing of 5 mm in both the horizontal and vertical directions. Three optical fibers 0.5 mm thick are placed in each vertical groove and a conventionally used fluorescence reflector such as Al$_2$O$_3$ or MgO is buried in the horizontal grooves to make detection pixels separated by the horizontal and vertical grooves. The fluorescence generated by stimulation with the radiation entering the detection pixels is detected with the optical fiber bundles placed in the vertical grooves and fiber bundles each consisting of ten 0.5-mm thick optical fibers and arranged on the top surface of the scintillator sheet, thereby producing a two-dimensional radiation image. The optical fibers may typically be wavelength shifting fiber BCF-92.

EXAMPLE 6

A two-dimensional radiation image detector according to Example 6 of the invention is described below with reference to FIG. 6. This embodiment is characterized by the following: the top surface of a scintillator sheet which generates fluorescence upon incidence of a radiation has grooves cut at predetermined spacings in a horizontal and a vertical direction to a depth at least one half the thickness of the scintillator sheet, with optical fiber bundles being placed in the vertical grooves and a fluorescence reflector buried in the horizontal grooves, and optical fiber bundles are arranged on the bottom surface of the scintillator sheet in a transverse direction normal to the optical fiber bundles within the vertical grooves and radiation detecting mediums that generate fluorescence by stimulation with a radiation are arranged on the top surface, thereby making detection pixels that are separated by the horizontal and vertical grooves, and the fluorescence generated by stimulation with the radiation launched into the detection pixels and the fluorescence generated from the radiation detecting mediums are detected by the optical fiber bundles placed within the vertical grooves in the scintillator sheet and the optical fiber bundles arranged on the bottom surface of the scintillator sheet, thereby producing a two-dimensional radiation image.

In Example 6, the scintillator sheet that is used as the substrate of the two-dimensional radiation image detecting medium is formed of a Li glass scintillator which emits fluorescence with a life of 60 ns at a wavelength of 390 nm. In the example, the scintillator sheet is sized 200 mm on each side and 2 mm in thickness. Using a diamond cutter or the like, grooves 0.6 mm wide and 1.5 mm deep are formed in the scintillator sheet at a spacing of 5 mm in both the horizontal and vertical directions. Three optical fibers 0.5 mm thick are placed in each vertical groove and a conventionally used fluorescence reflector such as $Al_2O_3$ or MgO is buried in the horizontal grooves to make detection pixels separated by the horizontal and vertical grooves.

The detecting medium may be the phosphor $Y_2SiO_5$:Ce which emits fluorescence at a wavelength near 390 nm at which the Li glass scintillator emits fluorescence. The fluorescence emitted by $Y_2SiO_5$:Ce has a life of 40 ns and a wavelength of 410 nm. When the top surface of the Li glass scintillator sized 5 mm×5 and 2 mm in thickness was coated with the powder of $Y_2SiO_5$:Ce and the detecting medium was irradiated with alpha rays of about 5 MeV from $^{241}$Am as an α-ray source, fluorescence was emitted from the lateral side of the Li glass scintillator to give the spectrum shown in FIG. 7. The intensity of the fluorescence detected at the lateral side of the scintillator was not very much different from the intensity detected at the back side of the scintillator. As a result, it was verified that the fluorescence from $Y_2SiO_5$:Ce could be detected through the Li glass scintillator at its lateral side.

Therefore, if the fluorescence generated by stimulation with the radiation entering the detection pixels and the fluorescence generated by stimulation with the radiation entering the radiation detecting mediums are detected with the optical fiber bundles placed in the vertical grooves and the fiber bundles each consisting of ten 0.5-mm thick optical fibers and arranged on the bottom surface of the scintillator sheet, one can obtain a two-dimensional radiation image with high efficiency. The optical fibers may typically be BCF-92 of Bicron, USA which is a wavelength shifting fiber also having sensitivity at the wavelength of 410 nm.

In Example 6, a phosphor in powder form is used as the detecting medium but it may be substituted by a thin scintillator. In FIG. 6, the radiation detecting medium is provided for each detection pixel but similar results are obtained if a sheet of radiation detecting medium is placed across the top surface of the scintillator sheet. It would be more effective to enhance the adhesion between adjacent sheets by application of optical grease or the like.

EXAMPLE 7

A two-dimensional radiation image detector according to Example 7 of the invention is described below with reference to FIG. 8. This embodiment is characterized by the following: the top surface of a fluorescence collecting sheet which has a transmittance that permits adequate transmission of the wavelength of fluorescence has grooves cut at predetermined spacings in a horizontal and a vertical direction to a depth at least one half the thickness of the fluorescence collectingh sheet, with optical fiber bundles being placed in the vertical grooves and a fluorescence reflector buried in the horizontal grooves, and optical fiber bundles are arranged on the bottom surface of the fluorescence collecting sheet in a transverse direction normal to the optical fiber bundles within the vertical grooves and radiation detecting mediums that generate fluorescence by-stimulation with a radiation are arranged on the top surface, thereby making detection pixels that are separated by the horizontal and vertical grooves; the fluorescence generated by stimulation with the radiation launched into the detection pixels and the fluorescence generated from the radiation detecting mediums are detected by the optical fiber bundles placed within the vertical grooves in the fluorescence collecting sheet and the optical fiber bundles arranged on the bottom surface of the fluorescence collecting sheet, thereby producing a two-dimensional radiation image.

The two-dimensional radiation image detector according to Example 7 is suitable for the case where a phosphor, particularly one in powder form, is used as the detecting medium. Exemplary phosphors include $BaFBr:Eu^{2+}$, $Y_2SiO_5$:Ce, $YAlO_3$:Ce and ZnS:Ag which are conventionally used to detect X-, β- or α-rays. In Example 7, $Y_2SiO_5$:Ce is used as the phosphor; it emits fluorescence with a life of 40 ns at a wavelength of 410 nm. Quartz glass is used as the fluorescence collecting sheet having a transmittance that permits adequate transmission of the wavelength of fluorescence. Quartz glass is capable of adequate transmission of wavelengths at 300 nm and more. In the example, the fluorescence collecting sheet is sized 200 mm on each side and 2 mm in thickness. Using a diamond cutter or the like, grooves 0.6 mm wide and 1.5 mm deep are formed in the fluorescence collecting sheet at a spacing of 5 mm in both the horizontal and vertical directions. Three optical fibers 0.5 mm thick are placed in each vertical groove and a conventionally used fluorescence reflector such as $Al_2O_3$ or MgO is buried in the horizontal grooves to make detection pixels separated by the horizontal and vertical grooves and which use $Y_2SiO_5$:Ce as the radiation detecting medium.

Figure 9:
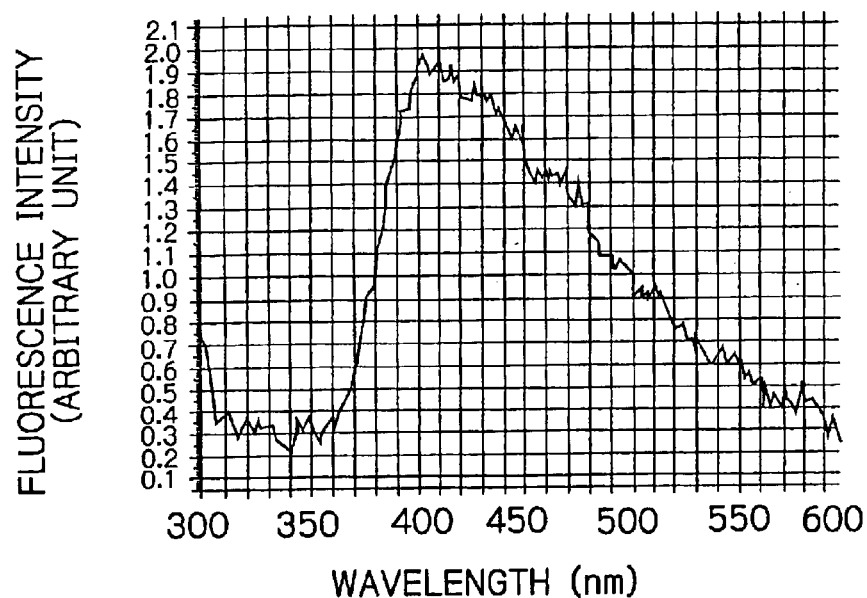
FIG. 9 shows the fluorescence spectrum obtained when the fluorescence emitted upon α-ray stimulation from the phosphor $Y_2SiO_5$:Ce placed on the top surface of the quartz glass was detected through it on the lateral side.

When the top surface of the quartz glass forming the fluorescence collecting sheet sized 5 mm×5 and 2 mm in thickness was coated with the powder of $Y_2SiO_5$:Ce and the radiation detecting medium was irradiated with alpha rays of about 5 MeV from $^{241}$Am as an α-ray source, fluorescence was emitted from the lateral side of the quartz glass to give the spectrum shown in FIG. 9. As a result, it was verified that the fluorescence from $Y_2SiO_5$:Ce could be detected through the quartz glass at its lateral side.

Therefore, if the fluorescence generated by stimulation with the radiation entering the detection pixels is detected with the optical fiber bundles placed in the vertical grooves and the fiber bundles each consisting of ten 0.5-mm thick optical fibers and arranged on the bottom surface of the fluorescence collecting sheet, one can obtain a two-dimensional radiation image. The optical fibers may typically be BCF-92 of Bicron, USA which is a wavelength shifting fiber having sensitivity at the wavelength of 410 nm.

In Example 7, a phosphor in powder form is used as the detecting medium but it may be substituted by a thin scintillator.

EXAMPLE 8

Figure 10:
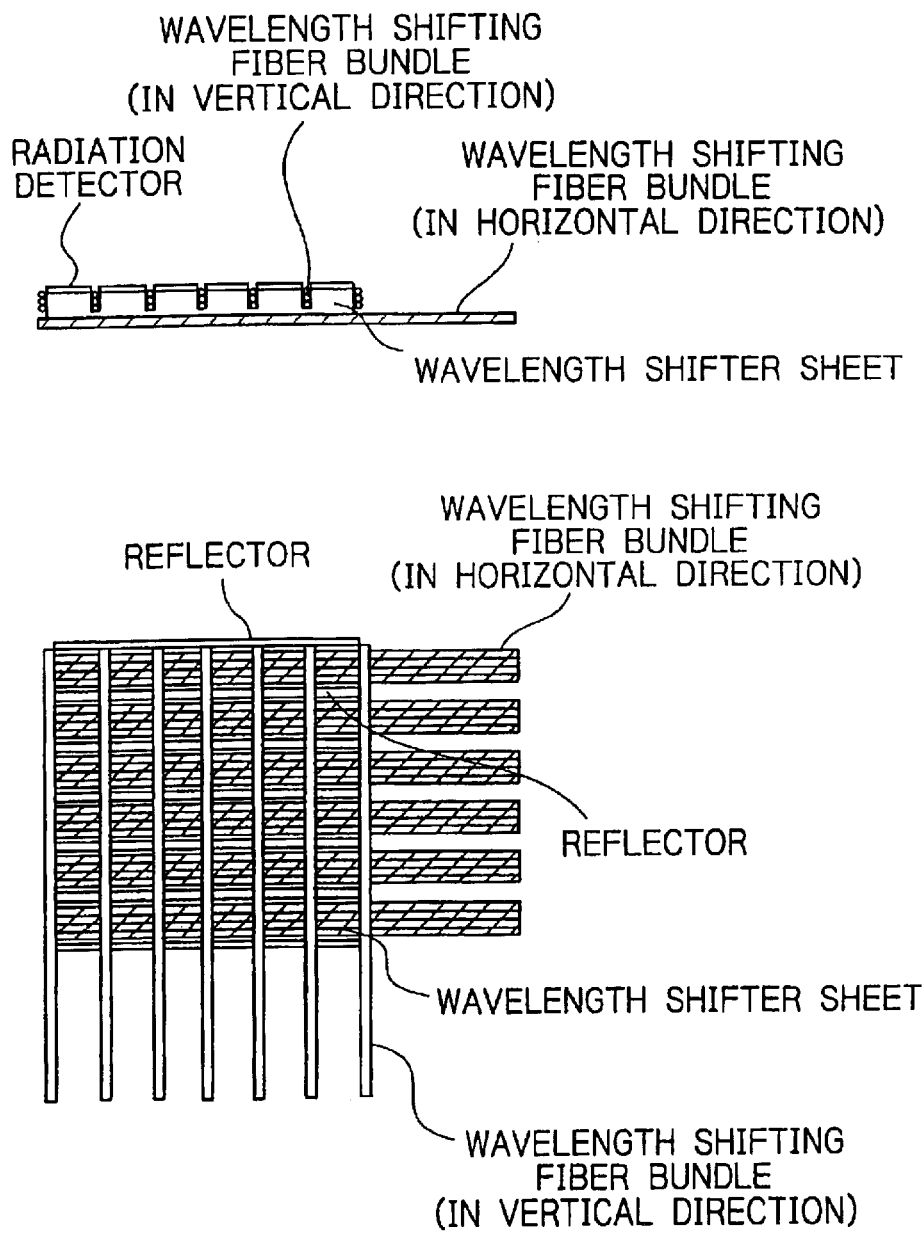
FIG. 10 shows another exemplary two-dimensional radiation image detector that uses a fluorescence collecting wavelength shifter sheet as a substrate and which produces a two-dimensional radiation image by detecting the fluorescence subjected to wavelength conversion by the wavelength shifter using bundles of wavelength shifting fibers arranged in grooves formed in the top surface of the wavelength shifter sheet in a vertical direction and bundles of wavelength shifting fibers arranged on the bottom surface of the wavelength shifter sheet.

A two-dimensional radiation image detector according to Example 8 of the invention is described below with reference to FIG. 10. This embodiment is characterized by the following: the top surface of a wavelength shifter sheet which is capable of shifting the wavelength of fluorescence to a different value has grooves cut at predetermined spacings in a horizontal and a vertical direction to a depth at least one half the thickness of the wavelength shifter sheet, with optical fiber bundles being placed in the vertical grooves and a fluorescence reflector buried in the horizontal grooves, and optical fiber bundles are arranged on the bottom surface of the wavelength shifter sheet in a transverse direction normal to the optical fiber bundles within the vertical grooves and radiation detecting mediums that generate fluorescence by stimulation with a radiation are arranged on the top surface; the fluorescence generated from the radiation detecting mediums is processed to have a different wavelength by the wavelength shifting capability of the wavelength shifter sheet and the wavelength-converted fluorescence is detected by the optical fiber bundles placed within the vertical grooves in the wavelength shifter sheet and the optical fiber bundles arranged on the bottom surface of the wavelength shifter sheet, thereby producing a two-dimensional radiation image.

The two-dimensional radiation image detector according to Example 8 is suitable for the case where a phosphor, particularly one in powder form, is used as the detecting medium. Exemplary phosphors include $BaFBr:Eu^{2+}$, $Y_2SiO_5:Ce$, $YAlO_3:Ce$ and $ZnS:Ag$ which are conventionally used to detect X-, β- or α-rays. The wavelength shifter sheet capable of shifting the wavelength of fluorescence to a different value may be a plastic wavelength shifter. In Example 8, $Y_2SiO_5:Ce$ is used as the phosphor; it emits fluorescence with a life of 40 ns at a wavelength of 410 nm. Plastic wavelength shifter BC-484 of Bicron, USA is used as the wavelength shifter sheet. In the example, the wavelength shifter sheet is sized 200 mm on each side and 2 mm in thickness. Using a diamond cutter or the like, grooves 0.6 mm wide and 1.5 mm deep are formed in the wavelength shifter sheet at a spacing of 5 mm in both the horizontal and vertical directions. Three optical fibers 0.5 mm thick are placed in each vertical groove and a conventional fluorescence reflector such as $Al_2O_3$ or MgO is buried in the horizontal grooves to make detection pixels separated by the horizontal and vertical grooves and which use $Y_2SiO_5:Ce$ as the radiation detecting medium.

Figure 11:
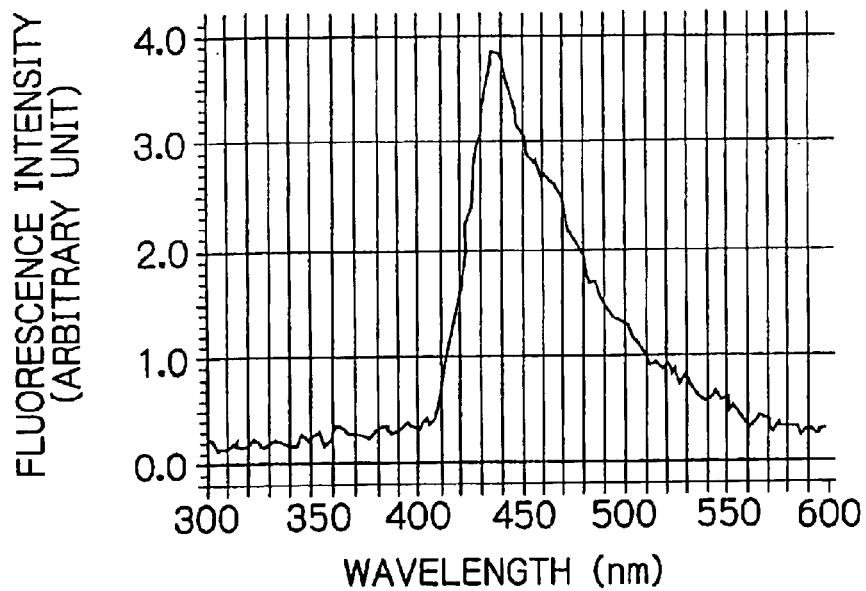
FIG. 11 shows the fluorescence spectrum obtained when the fluorescence emitted upon α-ray stimulation from the phosphor $Y_2SiO_5$:Ce placed on the top surface of the wavelength shifter was detected through it on the lateral side.

When the top surface of the wavelength shifter sheet sized 5 mm×5 and 2 mm in thickness was coated with the powder of $Y_2SiO_5:Ce$ and the radiation detecting medium was irradiated with alpha rays of about 5 MeV from $^{241}Am$ as an α-ray source, wavelength-shifted fluorescence was emitted from the lateral side of the wavelength shifter sheet to give the spectrum shown in FIG. 11. Obviously, the fluorescence having a center wavelength of 410 nm was converted to fluorescence of 434 nm. As a result, it was verified that the fluorescence from $Y_2SiO_5:Ce$ could be detected through the wavelength shifter sheet at its lateral side.

Therefore, if the fluorescence generated by stimulation with the radiation entering the detection pixels is detected with the optical fiber bundles placed in the vertical grooves and the fiber bundles each consisting of ten 0.5-mm thick optical fibers and arranged on the bottom surface of the wavelength shifter sheet, one can obtain a two-dimensional radiation image. The optical fibers may typically be Y-7 or Y-11 of Kuraray, Japan which is a wavelength shifting fiber having sensitivity at a wavelength of 434 nm.

In Example 8, a phosphor in powder form is used as the detecting medium but it may be substituted by a thin scintillator.

EXAMPLE 9

Figure 12:
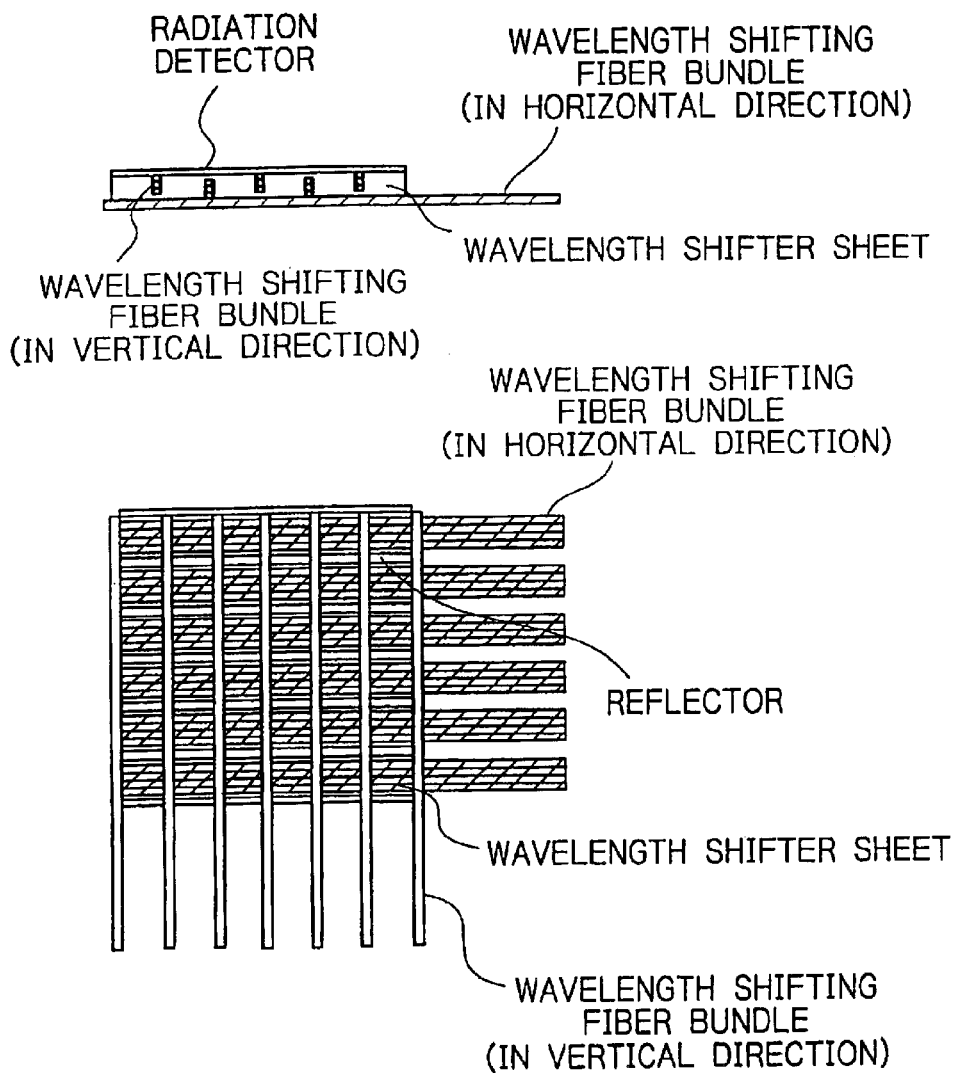
FIG. 12 shows another exemplary two-dimensional radiation image detector that uses a scintillator sheet as a substrate which has grooves formed alternately in its top and bottom surfaces in both a horizontal and a vertical direction and which produces a two-dimensional radiation image by detecting the fluorescence from the scintillator using bundles of wavelength shifting fibers placed in the grooves in the vertical direction and bundles of wavelength shifting fibers arranged on the bottom surface of the scintillator sheet.

A two-dimensional radiation image detector according to Example 9 of the invention is described below with reference to FIG. 12. This embodiment is the same as Examples 6-8 except on the following points: the top and bottom surfaces of a scintillator sheet, a fluorescence collecting sheet or a wavelength shifter sheet are alternately provided with grooves that are cut at predetermined spacings in a horizontal and a vertical direction to a depth at least one half the thickness of the respective sheets and a fluorescence reflector is buried in the grooves to make a group of detection pixels that are separated by the horizontal and vertical grooves and which are capable of producing a two-dimensional radiation image.

If the basis is Example 8, pixels can be fabricated on the wavelength shifter sheet by a method in which the top and bottom surfaces of the wavelength shifter sheet are alternately provided with grooves that are cut at predetermined spacings in a horizontal and a vertical direction to a depth at least one half the thickness of the wavelength shifter sheet and in which a fluorescence reflector is buried in the grooves to make a group of detection pixels that are separated by the horizontal and vertical grooves. The wavelength shifter sheet, radiation detecting medium and the wavelength shifting fiber that are to be used in Example 9 may be made of the same materials to have the same structure as in Example 8.

EXAMPLE 10

A two-dimensional radiation image detector according to Example 10 of the invention is described below with reference to FIG. 13. This embodiment is characterized by the following: rectangular scintillator blocks are arranged in a planar matrix; an optical fiber bundle is provided on opposed lateral sides of the vertical arrays of rectangular scintillator blocks whereas a reflector is provided on opposed lateral sides of the horizontal arrays; in addition, a reflector is provided on the top surface of each scintillator block whereas optical fiber bundles are arranged on the bottom surfaces of the scintillator blocks in planar matrix in a transverse direction which is normal to the optical fiber bundles provided on the lateral sides of the vertical arrays of scintillator blocks; with this structural design, the fluorescence generated by stimulation with a radiation entering the respective rectangular scintillator blocks is detected by the optical fiber bundles provided on the lateral sides of the vertical arrays of scintiallator blocks and the optical fiber bundles arranged on their bottom surfaces, thereby producing a two-dimensional radiation image.

In Example 10, the rectangular scinitillator that can be used as the substrate of the two-dimensional radiation image detecting medium is formed of a Li glass scintillator which emits fluorescence with a life of 60 ns at a wavelength of 390 nm. In the example, one scintillator block is sized 5 mm on each side and 2 mm in thickness. Such scintillator blocks are arranged in a planar 10×10 matrix. Four optical fibers 0.5 mm thick are arranged on each of the opposed lateral sides of the vertical arrays of scintillator blocks and a conventional fluorescence reflector such as $Al_2O_3$ or MgO is provided on the lateral sides of the horizontal arrays of scintillator blocks. A fluorescence reflector is also provided on the top surface of each scintillator block. Thus, one scintillator block constitutes one detection pixel.

Ten optical fibers 0.5 mm thick are arranged on the bottom surface of each scintillator block in the horizontal direction. Such optical fiber bundles combined with those arranged on the lateral sides of the vertical arrays of scintillator blocks detect the fluorescence generated by stimulation with the radiation entering the detection pixels, whereby a two-dimensional radiation image is produced. The optical fibers may typically be BCF-92 of Bicron, USA which is a wavelength shifting fiber also having sensitivity at the wavelength of 410 nm.

EXAMPLE 11

Figure 14:
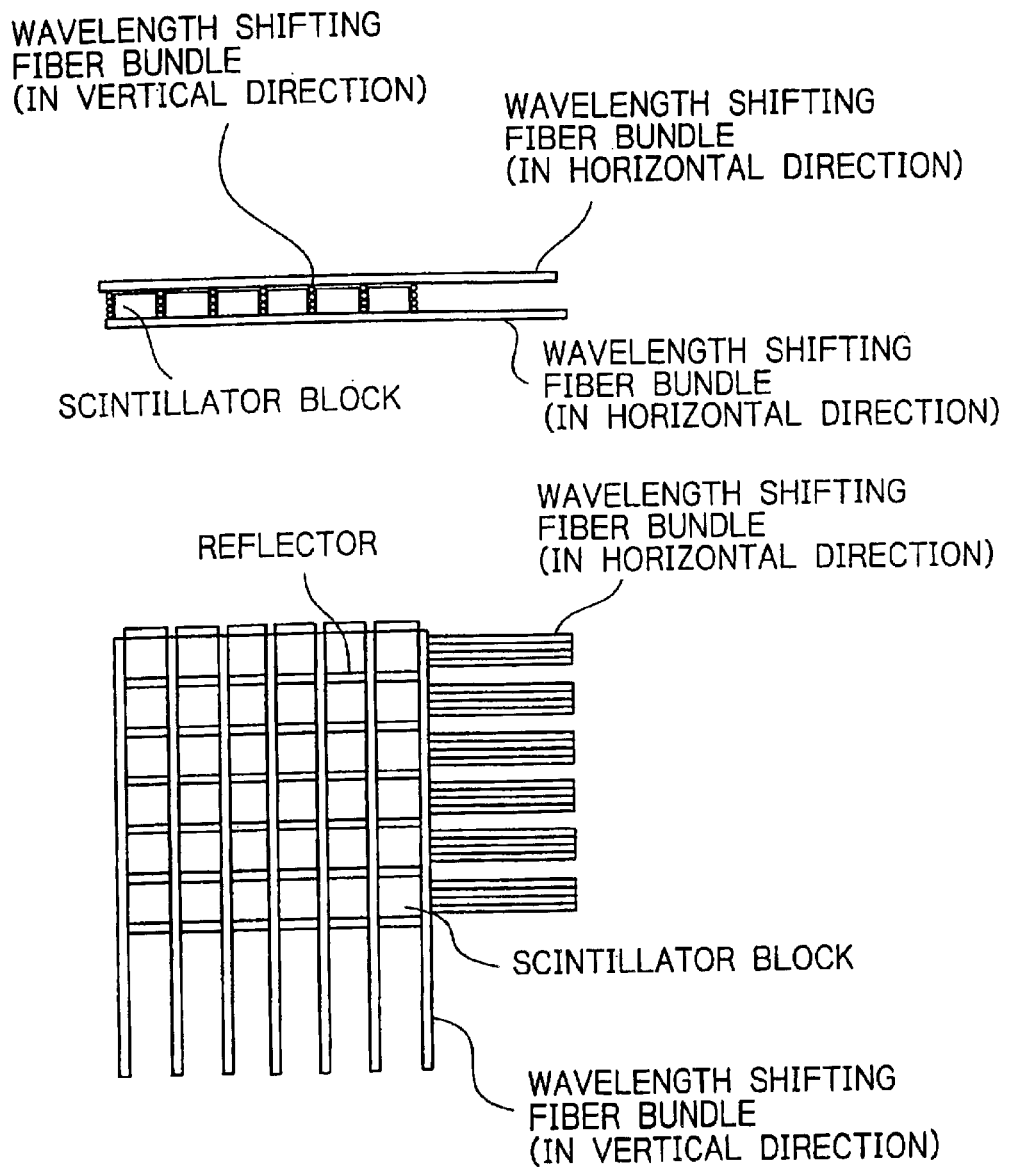
FIG. 14 shows another exemplary two-dimensional radiation image detector that produces a two-dimensional radiation image by detecting the fluorescence from a scintillator using bundles of wavelength shifting fibers arranged on opposed lateral sides of the vertical arrays of rectangular scintillator blocks arranged in a plane and bundles of wavelength shifting fibers arranged in a horizontal direction on the bottom surfaces of the scintillator blocks.

A two-dimensional radiation image detector according to Example 11 of the invention is described below with reference to FIG. 14. This embodiment is characterized by the following: rectangular scintillator blocks are arranged in a planar matrix; an optical fiber bundle is provided on opposed lateral sides of the vertical arrays of rectangular scintillator blocks whereas a reflector is provided on opposed lateral sides of the horizontal arrays; optical fiber bundles are arranged on the top and bottom surfaces of the scintillator blocks in planar matrix in a transverse direction which is normal to the optical fiber bundles provided on the lateral sides of the vertical arrays of scintillator blocks; with this structural design, the fluorescence generated by stimulation with the radiation entering the respective rectangular scintillator blocks is detected by the optical fiber bundles provided on the lateral sides of the vertical arrays of scintillator blocks and the optical fiber bundles arranged on their top and bottom surfaces, whereby a two-dimensional radiation image is produced.

To implement Example 11, the reflector placed on the top surface of each scintillator block in Example 10 is replaced by 10 optical fibers with a thickness of 0.5 mm which are arranged on the top surface of each scintillator block.

These optical fibers are combined with the ten optical fibers 0.5 mm thick which are placed on the bottom surface of each scintillator block in the horizontal direction. The thus provided set of horizontal optical fiber bundles are in turn combined with those arranged on the lateral sides of the vertical arrays of scintillator blocks. Using these two groups of optical fiber bundles, one can detect the fluorescence generated by stimulation with the radiation entering the detection pixels, thereby producing a two-dimensional radiation image.

EXAMPLE 12

Figure 15:
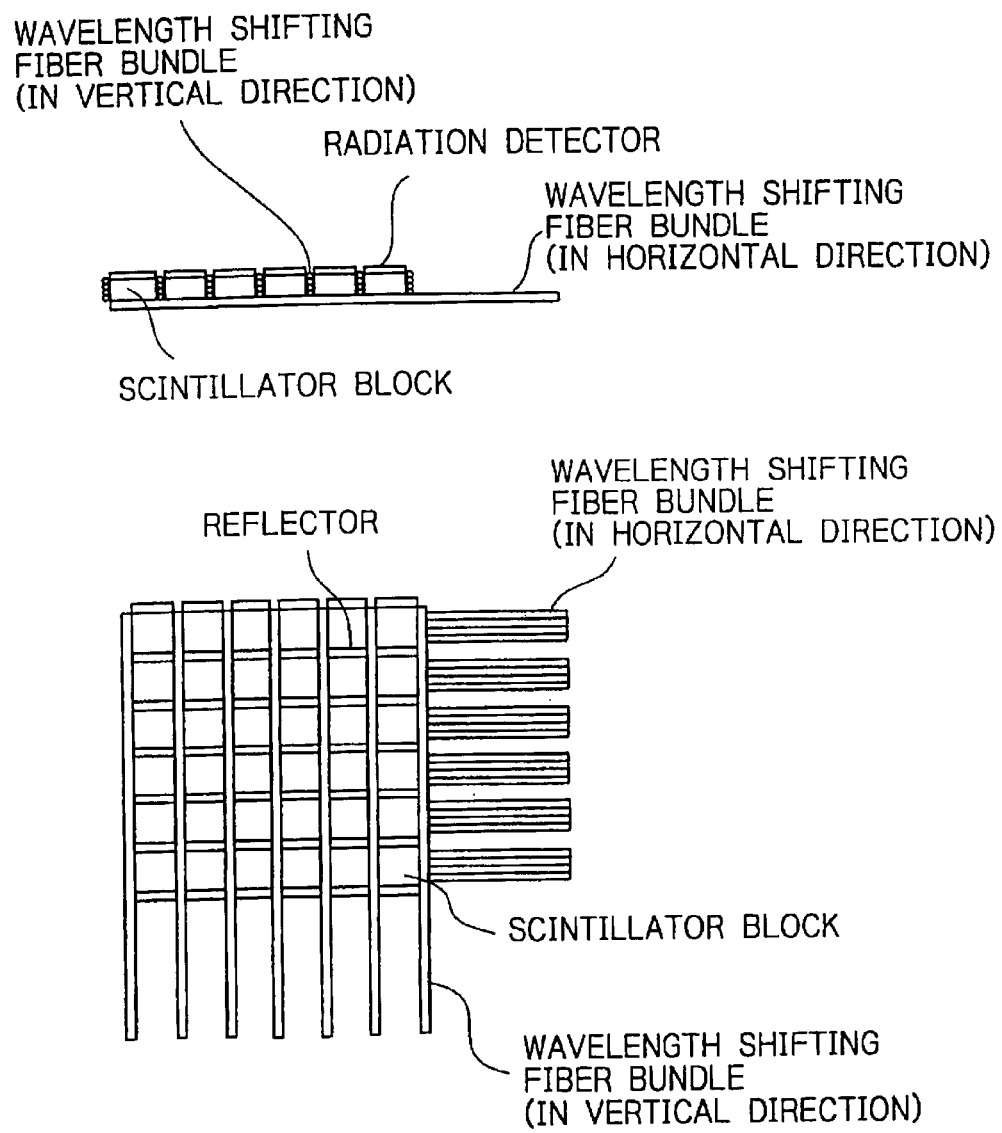
FIG. 15 shows another exemplary two-dimensional radiation image detector that produces a two-dimensional radiation image by detecting the fluorescence from radiation detecting mediums placed on the top surfaces of rectangular scintillator blocks arranged in a plane and from the scintillator using bundles of wavelength shifting fibers arranged on opposed lateral sides of the vertical arrays of scintillator blocks and bundles of wavelength shifting fibers arranged in a horizontal direction on the bottom surfaces of the scintillator blocks.

A two-dimensional radiation image detector according to Example 12 of the invention is described below with reference to FIG. 15. This embodiment is characterized by the following: rectangular scintillator blocks are arranged in a planar matrix; an optical fiber bundle is provided on opposed lateral sides of the vertical arrays of rectangular scintillator blocks whereas a reflector is provided on opposed lateral sides of the horizontal arrays; in addition, a radiation detecting medium which generates fluorescence upon stimulation by radiation is provided on the top surface of each scintillator block whereas optical fiber bundles are arranged on the bottom surfaces of the scintillator blocks in planar matrix in a direction which is normal to the optical fiber bundles provided on the lateral sides of the vertical arrays of scintillator blocks; with this structural design, the fluorescence generated by stimulation with the radiation entering the respective rectangular scintillator blocks and the fluorescence generated from the radiation detecting mediums are detected by the optical fiber bundles provided on the lateral sides of the vertical arrays of scintiallator blocks and the optical fiber bundles arranged on their bottom surfaces, whereby a two-dimensional radiation image is produced.

In Example 12, the rectangular scinitillator blocks that can be used as the substrate of the two-dimensional radiation image detecting medium are formed of a Li glass scintillator which emits fluorescence with a life of 60 ns at a wavelength of 390 nm. In the example, one scintillator block is sized 5 mm on each side and 2 mm in thickness. Such scintillator blocks are arranged in a planar 10×10 matrix. Four optical fibers 0.5 mm thick are arranged on each of the opposed lateral sides of the vertical arrays of scintillator blocks and a conventional fluorescence reflector such as $Al_2O_3$ or MgO is provided on the lateral sides of the horizontal arrays of scintillator blocks. A radiation detecting medium which emits fluorescence upon stimulation with radiation is also provided on the top surface of each scintillator block. Examples of the radiation detecting medium include $BaFBr:Eu^{2+}$, $Y_2SiO_5:Ce$ and $YAlO_3:Ce$ in powder form that are phosphors used to detect X-, β- or α-rays and which emit fluorescence at wavelengths near the wavelength of the fluorescence emitted from the Li glass scintillator. One scintillator block of this structure constitutes one detection pixel.

Four optical fibers 0.5 mm thick are arranged on the bottom surface of each scintillator block in the horizontal direction. Such optical fiber bundles combined with those arranged on the lateral sides of the vertical arrays of scintillator blocks detect the fluorescence generated by stimulation with the radiation entering the detection pixels, thereby producing a two-dimensional radiation image. The optical fibers may typically be BCF-92 of Bicron, USA which is a wavelength shifting fiber also having sensitivity at the wavelength of 390 nm.

EXAMPLE 13

Figure 16:
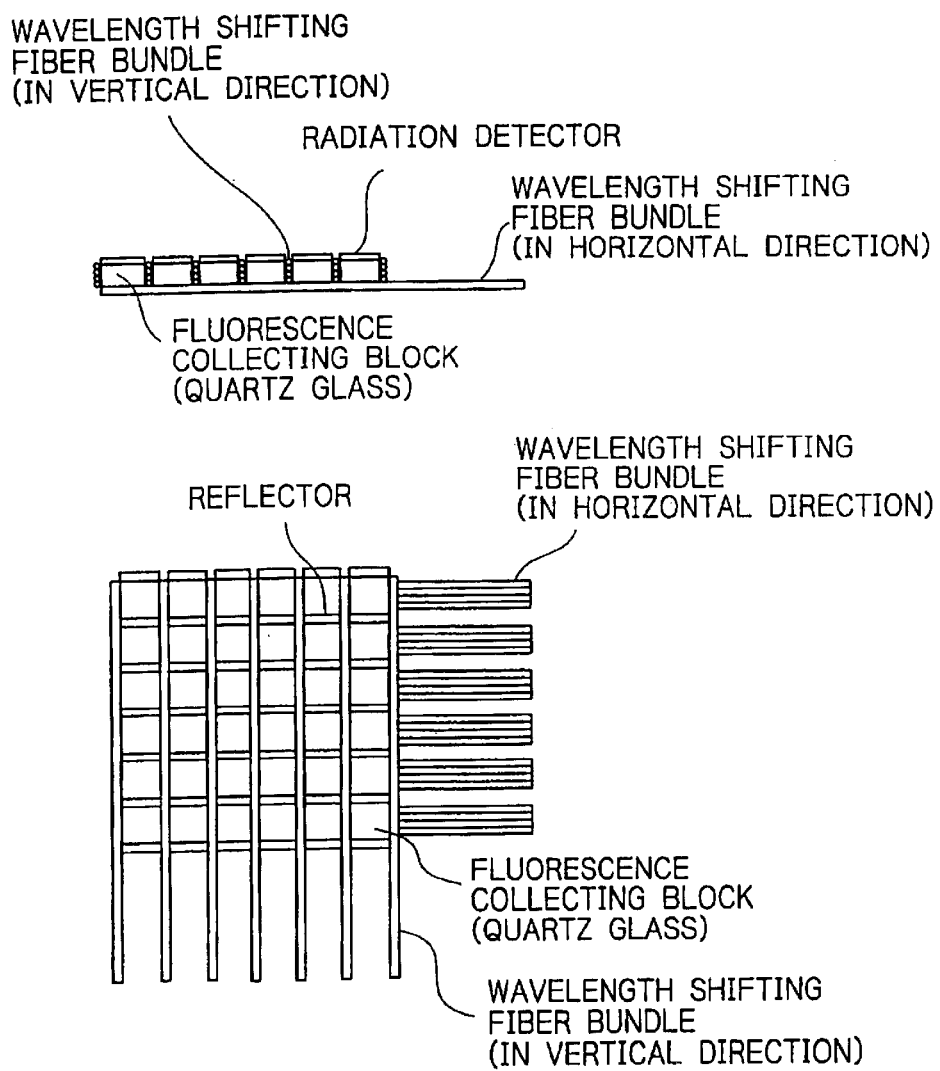
FIG. 16 shows another exemplary two-dimensional radiation image detector that produces a two-dimensional radiation image by detecting the fluorescence from radiation detecting mediums placed on the top surfaces of rectangular fluorescence collecting quartz glass blocks arranged in a plane using bundles of wavelength shifting fibers arranged on opposed lateral sides of the vertical arrays of quartz glass blocks and bundles of wavelength shifting fibers arranged in a horizontal direction on the bottom surfaces of the quartz glass blocks.

A two-dimensional radiation image detector according to Example 13 of the invention is described below with reference to FIG. 16. This embodiment is characterized by the following: rectangular fluorescence collecting blocks having a transmittance that permits adequate transmission of the wavelength of fluorescence are arranged in a planar matrix; an optical fiber bundle is provided on opposed lateral sides of the vertical arrays of rectangular fluorescence collecting blocks whereas a reflector is provided on opposed lateral sides of the horizontal arrays; in addition, a radiation detecting medium that generates fluorescence upon stimulation with a radiation is provided on the top surface of each fluorescence collecting block whereas optical fiber bundles are arranged on the bottom surfaces of the fluorescence collecting blocks in planar matrix in a transverse direction which is normal to the optical fiber bundles provided on the lateral sides of the vertical arrays of fluorescence collecting blocks; with this structural design, the fluorescence emitted from the radiation detecting mediums placed on the respective fluorescence collecting blocks is detected by the optical fiber bundles provided on the lateral sides of the vertical arrays of fluorescence collecting blocks and the optical fiber bundles arranged on their bottom surfaces, whereby a two-dimensional radiation image is produced.

In Example 13, quartz glass is used as the material of the rectangular fluorescence collecting blocks that are used as the fluorescence collecting substrate of the two-dimensional radiation image detecting medium. Quartz glass has sufficient ability to transmit wavelengths of 300 nm and more. In the example, one fluorescence collecting block is sized 5 mm on each side and 2 mm in thickness. Such fluorescence collecting blocks are arranged in a planar 10×10 matrix. Four optical fibers 0.5 mm thick are arranged on each of the opposed lateral sides of the vertical arrays of fluorescence collecting blocks and a conventional fluorescence reflector such as $Al_2O_3$ or MgO is provided on the lateral sides of the horizontal arrays of fluorescence collecting blocks. A radiation detecting medium which emits fluorescence upon stimulation with a radiation is also provided on the top surface of each fluorescence collecting block. Exemplary radiation detecting mediums include the powders of $BaFBr:Eu^{2+}$, $Y_2SiO_5:Ce$, $YAlO_3:Ce$ and ZnS:Ag which are phosphors conventionally used to detect X-, β- or α-rays. One fluorescence collecting block of the above-described structure constitutes one detection pixel.

Ten optical fibers 0.5 mm thick are arranged on the bottom surface of each fluorescence collecting block in the horizontal direction. Such optical fiber bundles combined with those arranged on the lateral sides of the vertical arrays of the fluorescence collecting blocks detect the fluorescence generated by stimulation with the radiation entering the detection pixels, whereby a two-dimensional radiation image is produced. The optical fibers may typically be BCF-92 of Bicron, USA or Y-11 of Kuraray, Japan which are wavelength shifting fibers that have sensitivity in the wavelength range of 390 nm–410 nm and which are selectively used depending upon the wavelength of the fluorescence to be emitted.

EXAMPLE 14

Figure 17:
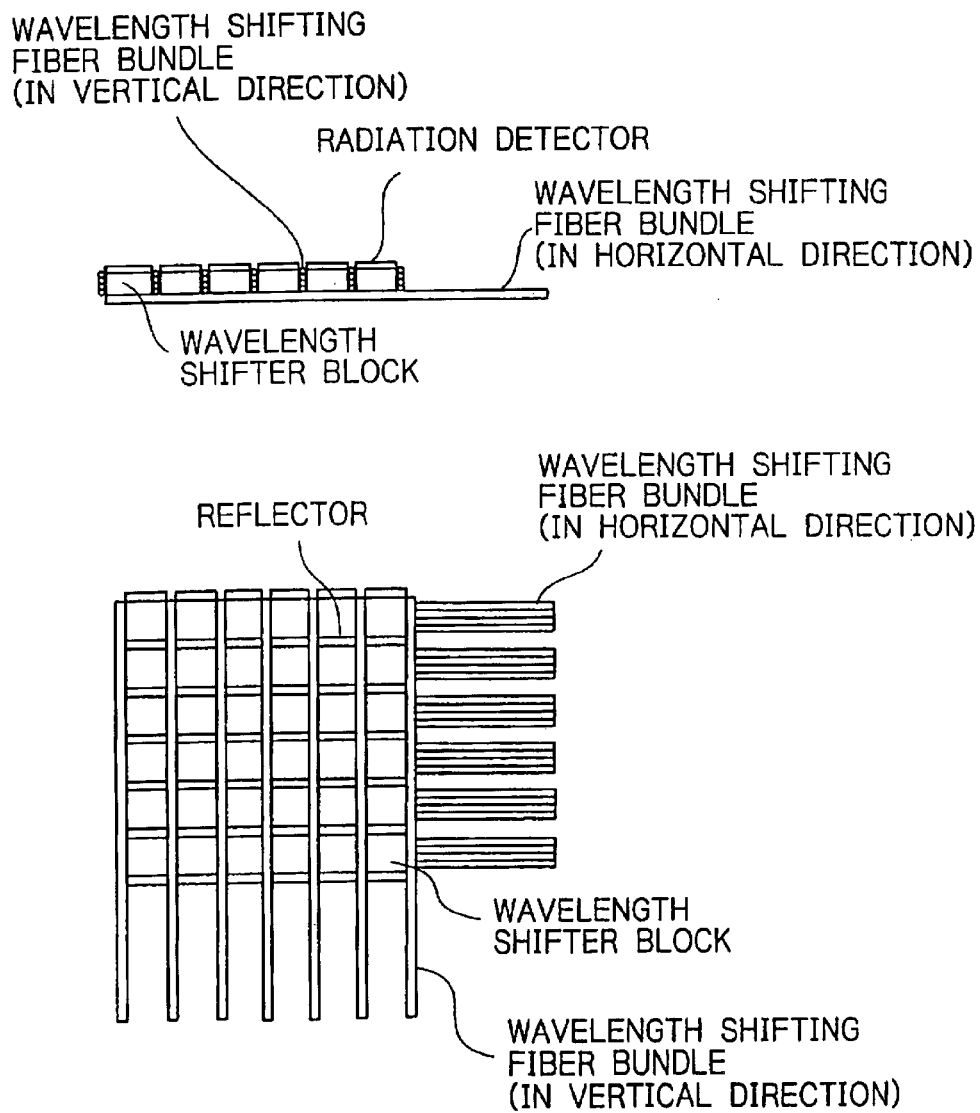
FIG. 17 shows another exemplary two-dimensional radiation image detector that produces a two-dimensional radiation image by detecting the fluorescence emitted from radiation detecting mediums placed on the top surfaces of rectangular fluorescence collecting wavelength shifter blocks arranged in a plane after wavelength conversion by the wavelength shifter blocks using bundles of wavelength shifting fibers arranged on opposed lateral sides of the vertical arrays of wavelength shifter blocks and bundles of wavelength shifting fibers arranged in a horizontal direction on the bottom surfaces of the wavelength shifter blocks.

A two-dimensional radiation image detector according to Example 14 of the invention is described below with reference to FIG. 17. This embodiment is characterized by the following: rectangular wavelength shifter blocks capable of shifting the wavelength of fluorescence to a different value are arranged in a planar matrix; an optical fiber bundle is provided on opposed lateral sides of the vertical arrays of rectangular wavelength shifter blocks whereas a reflector is provided on opposed lateral sides of the horizontal arrays; in addition, a radiation detecting medium that generates fluorescence upon stimulation with a radiation is provided on the top surface of each wavelength shifter block whereas optical fiber bundles are arranged on the bottom surfaces of the wavelength shifter blocks in planar matrix in a direction which is normal to the optical fiber bundles provided on the lateral sides of the vertical arrays of wavelength shifter blocks; with this structural design, the fluorescence generated from the radiation detecting mediums placed on the respective rectangular wavelength shifter blocks is processed to have a different wavelength by the wavelength shifting capability of the wavelength shifter blocks and the wavelength-converted fluorescence is detected by the optical fiber bundles provided on the lateral sides of the vertical arrays of wavelength shifter blocks and the optical fiber bundles arranged on their bottom surfaces, whereby a two-dimensional radiation image is produced.

In Example 14, the rectangular wavelength shifter blocks that are used as the substrate of the two-dimensional radiation image detecting medium are formed of the plastic wavelength shifter BC-484 of Bicron, USA. This plastic wavelength shifter is capable of adequately efficient wavelength conversion of fluorescence from 370 nm to 434 nm. In the example, one wavelength shifter block is sized 5 mm on each side and 2 mm in thickness. Such wavelength shifter blocks are arranged in a planar 10×10 matrix. Four optical fibers 0.5 mm thick are arranged on each of the opposed lateral sides of the vertical arrays of wavelength shifter blocks and a conventional fluorescence reflector such as $Al_2O_3$ or MgO is provided on the lateral sides of the horizontal arrays of wavelength shifter blocks. A radiation detecting medium that generates fluorescence upon stimulation with a radiation is provided on the top surface of each wavelength shifter block. For efficient wavelength shifting, phosphors emitting fluorescence in the wavelength range of 370 nm–400 nm can be used. For example, the powder of $YAlO_3:Ce$ which is a phosphor used to detect X-, β- or α-rays may be used as the radiation detecting medium. This phosphor emits fluorescence with a life of 30 ns at a wavelength of 370 nm. One plastic wavelength shifter of the above-described structure constitutes one detection pixel.

Ten optical fibers 0.5 mm thick are arranged on the bottom surface of each wavelength shifter block in the horizontal direction. Such optical fiber bundles combined with those arranged on the lateral sides of the vertical arrays of wavelength shifter blocks detect the fluorescence generated by stimulation with the radiation entering the detection pixels, whereby a two-dimensional radiation image is produced. The optical fibers may typically be Y-7 or Y-11 of Kuraray, Japan which is a wavelength shifting fiber having sensitivity at the wavelength of 434 nm.

EXAMPLE 15

Figure 18:
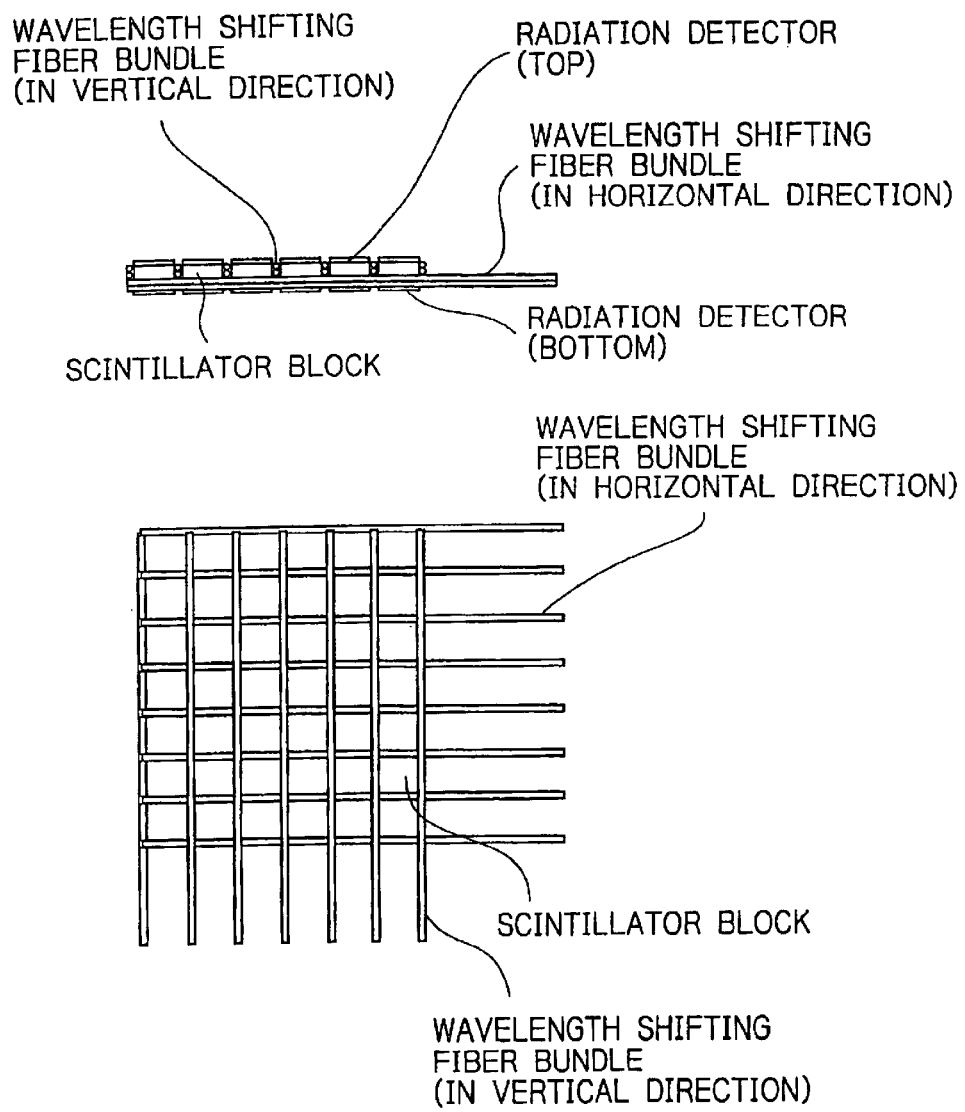
FIG. 18 shows another exemplary two-dimensional radiation image detector that produces a two-dimensional radiation image by detecting the fluorescence from radiation detecting mediums placed on the top and bottom surfaces of rectangular scintillator blocks arranged in a plane and from the scintillator blocks using bundles of wavelength shifting fibers arranged on opposed lateral sides of the vertical arrays of scintillator blocks and bundles of wavelength shifting fibers arranged on opposed lateral sides of the horizontal arrays of scintillator blocks.

A two-dimensional radiation image detector according to Example 15 of the invention is described below with reference to FIG. 18. This embodiment is characterized by the following: rectangular scintillator blocks are arranged in a planar matrix; an optical fiber bundle is mounted on opposed lateral sides of the vertical arrays of rectangular scintillator blocks whereas an optical fiber bundle is also provided on opposed lateral sides of the horizontal arrays; in addition, a radiation detecting medium which generates fluorescence upon stimulation with a radiation is provided on either the top or bottom or both surfaces of each scintillator block; with this structural design, the fluorescence generated by stimulation with the radiation entering the respective rectangular scintillator blocks and the fluorescence emitted from the radiation detecting mediums placed on either the top or bottom or both surfaces of the scintillator blocks are detected by the optical fiber bundles provided on the lateral sides of both vertical and horizontal arrays of scintillator blocks, whereby a two-dimensional radiation image is produced.

In Example 15, the rectangular scintillator that is used as the substrate of the two-dimensional radiation image detecting medium is formed of a Li glass scintillator which emits fluorescence with a life of 60 ns at a wavelength of 390 nm. In the example, one scintillator block is sized 5 mm on each side and 2 mm in thickness. Such scintillator blocks are arranged in a planar 10×10 matrix. Two optical fibers 0.5 mm thick are arranged on each of the opposed lateral sides of the horizontal arrays of scintillator blocks and two optical fibers 0.5 mm thick are also arranged on each of the opposed lateral sides of the vertical arrays. Provided on the top surfaces of the scintillator blocks is a fluorescence reflector such as $Al_2O_3$ or MgO which are conventionally used to reflect fluorescence toward the bottom surfaces of the scintillator blocks. In Example 15, the radiation detecting mediums are placed on the top surfaces of the scintillator blocks but they may be placed on the bottom or on both top and bottom surfaces. One scintillator block having the above-described structure constitutes one detection pixel.

Using the above-described optical fiber bundles placed on the lateral sides of both horizontal and vertical arrays of scintillator blocks, one can detect the fluorescence generated upon stimulation with the radiation entering the detection pixels, whereby a two-dimensional radiation image is produced. The optical fibers may typically be BCF-92 of Bicron, USA which is a wavelength shifting fiber also having sensitivity at the wavelength of 390 nm.

EXAMPLE 16

Figure 19:
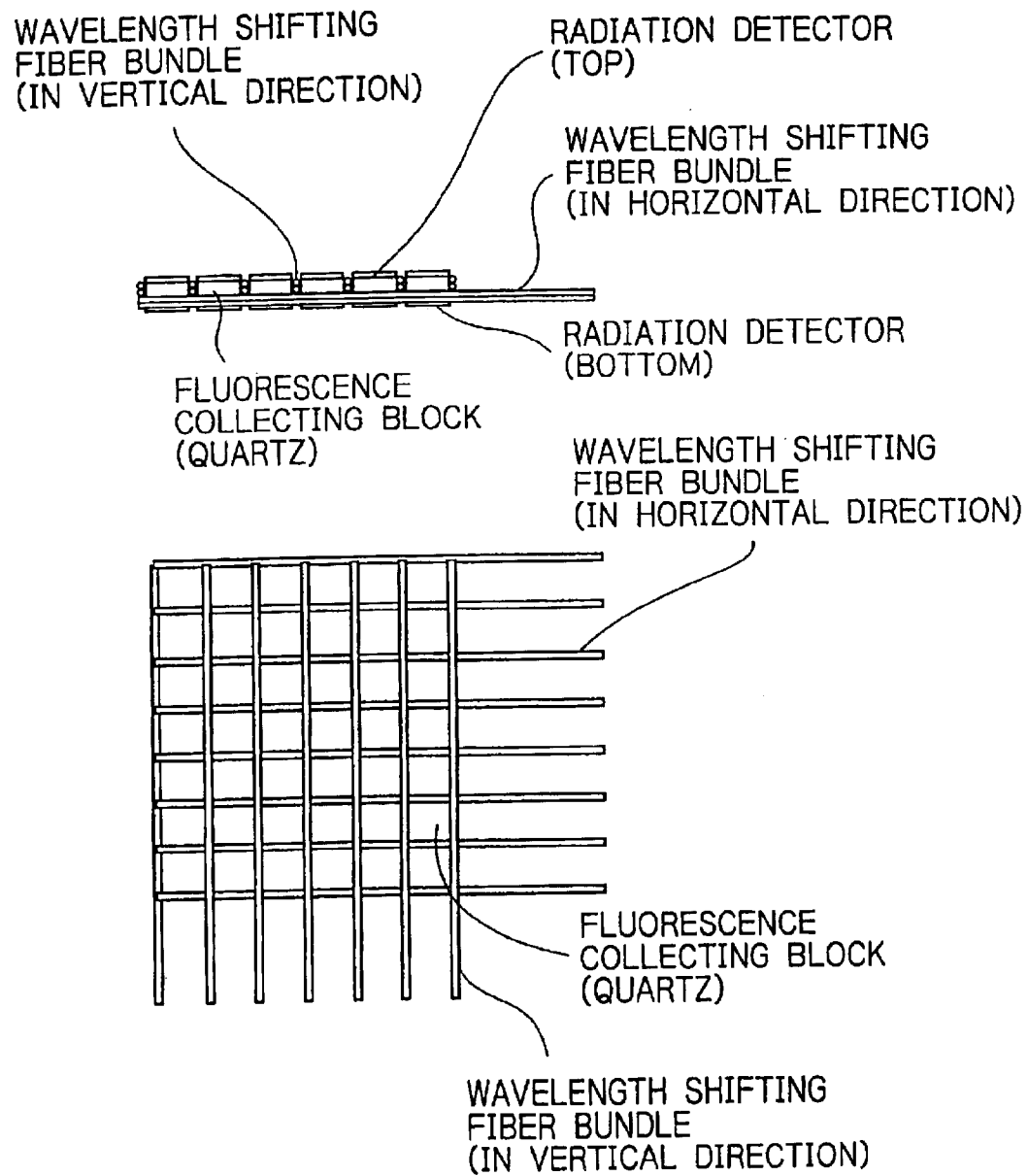
FIG. 19 shows another exemplary two-dimensional radiation image detector that produces a two-dimensional radiation image by detecting the fluorescence from radiation detecting mediums placed on the top and bottom surfaces of rectangular fluorescence collecting quartz glass blocks arranged in a plane using bundles of wavelength shifting fibers arranged on opposed lateral sides of the vertical arrays of quartz glass blocks and bundles of wavelength shifting fibers arranged on opposed lateral sides of the horizontal arrays of quartz glass blocks.

A two-dimensional radiation image detector according to Example 16 of the invention is described below with reference to FIG. 19. This embodiment is characterized by the following: rectangular fluorescence collecting blocks having a transmittance that permits adequate transmission of the wavelength of fluorescence are arranged in a planar matrix; an optical fiber bundle is mounted on opposed lateral sides of the vertical arrays of rectangular fluorescence collecting blocks whereas an optical fiber bundle is also provided on opposed lateral sides of the horizontal arrays; in addition, a radiation detecting medium which generates fluorescence upon stimulation with a radiation is provided on either the top or bottom or both surfaces of-each fluorescence collecting block; with this structural design, the fluorescence emitted from the radiation detecting mediums placed on either the top or bottom or both surfaces of the rectangular fluorescence collecting blocks is detected by the optical fiber bundles provided on the lateral sides of both vertical and horizontal arrays of fluorescence collecting blocks, whereby a two-dimensional radiation image is produced.

In Example 16, quartz glass is used as the material of the rectangular fluorescence collecting blocks that are used as the fluorescence collecting substrate of the two-dimensional radiation image detecting medium. Quartz glass has sufficient ability to transmit wavelengths of 300 nm and more. In the example, one fluorescence collecting block is sized 5 mm on each side and 2 mm in thickness. Such fluorescence collecting blocks are arranged in a planar 10×10 matrix. Two optical fibers 0.5 mm thick are arranged on each of the opposed lateral sides of the horizontal arrays of fluorescence collecting blocks and two optical fibers 0.5 mm thick are also arranged on each of the opposed lateral sides of the vertical arrays. Provided on the top surfaces of the fluorescence collecting blocks is a fluorescence reflector such as $Al_2O_3$ or MgO which are conventionally used to reflect fluorescence toward the bottom surfaces of the fluorescence collecting blocks. In Example 16, the radiation detecting mediums are placed on the top surfaces of the fluorescence collecting blocks but they may be placed on the bottom or on both top and bottom surfaces. One fluorescence collecting block having the above-described structure constitutes one detection pixel.

Using the above-described optical fiber bundles placed on the lateral sides of both horizontal and vertical arrays of fluorescence collecting blocks, one can detect the fluorescence generated upon stimulation with the radiation entering the detection pixels, whereby a two-dimensional radiation image is produced. The optical fibers may typically be BCF-92 of Bicron, USA which is a wavelength shifting fiber also having sensitivity at the wavelength of 390 nm.

EXAMPLE 17

Figure 20:
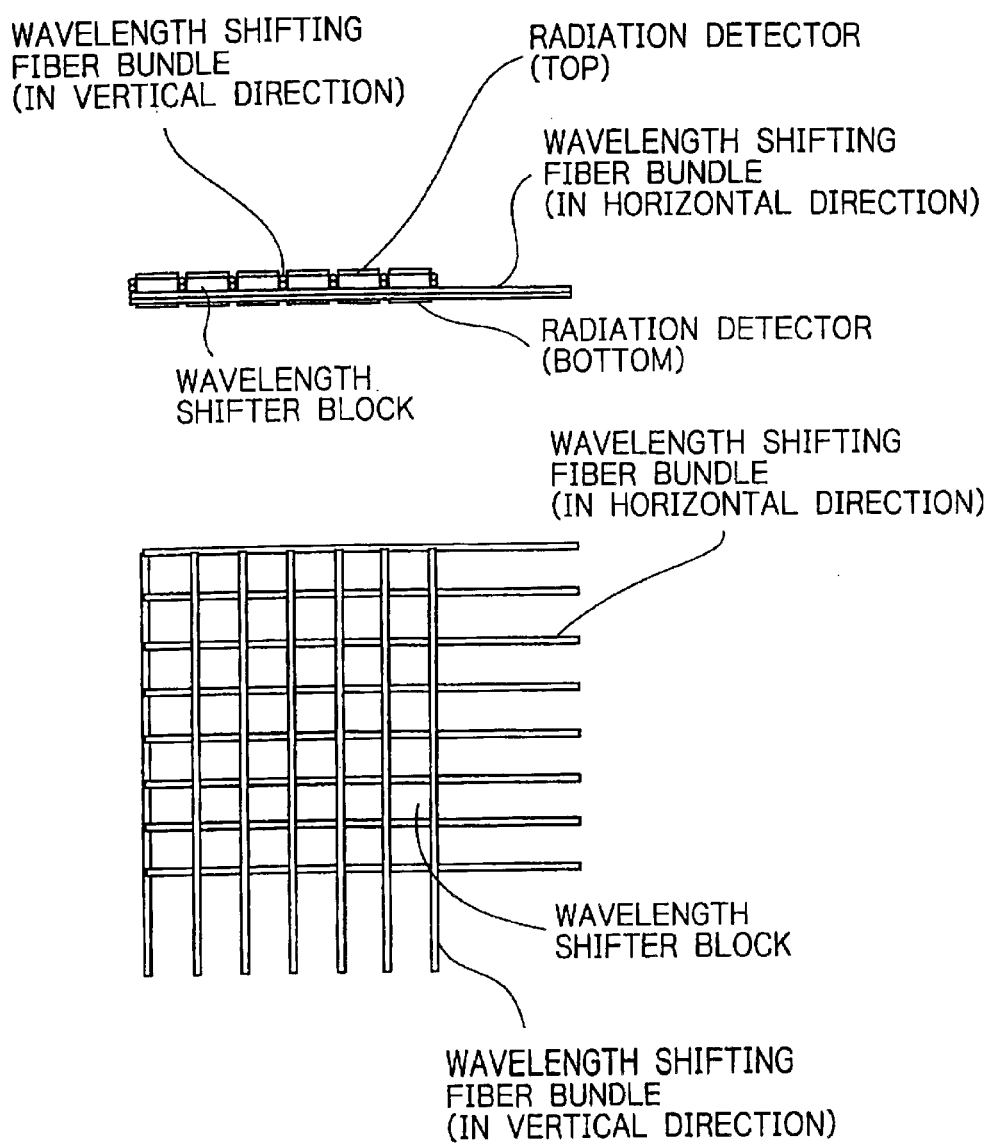
FIG. 20 shows another exemplary two-dimensional radiation image detector that produces a two-dimensional radiation image by detecting the fluorescence emitted from radiation detecting mediums placed on the top and bottom surfaces of rectangular fluorescence collecting wavelength shifter blocks arranged in a plane after wavelength conversion by the wavelength shifter blocks using bundles of wavelength shifting fibers arranged on opposed lateral sides of the vertical arrays of wavelength shifter blocks and bundles of wavelength shifting fibers arranged on opposed lateral sides of the horizontal arrays of wavelength shifter blocks.

A two-dimensional radiation image detector according to Example 17 of the invention is described below with reference to FIG. 20. This embodiment is characterized by the following: rectangular wavelength shifter blocks capable of shifting the wavelength of fluorescence to a different value are arranged in a planar matrix; an optical fiber bundle is mounted on opposed lateral sides of the vertical arrays of rectangular wavelength shifter blocks whereas an optical fiber bundle is also provided on opposed lateral sides of the horizontal arrays; in addition, a radiation detecting medium which generates fluorescence upon stimulation with a radiation is provided on either the top or bottom or both surfaces of each wavelength shifter block; with this structural design, the fluorescence emitted from the radiation detecting mediums placed on either the top or bottom or both surfaces of the rectangular wavelength shifter blocks is processed to have a different wavelength by the wavelength shifting capability of the wavelength shifter blocks and the wavelength-converted fluorescence is detected by the optical fiber bundles provided on the lateral sides of both vertical and horizontal arrays of wavelength shifter blocks, whereby a two-dimensional radiation image is produced.

In Example 17, the rectangular wavelength shifter blocks that are used as the substrate of the two-dimensional radiation image detecting medium are formed of the plastic wavelength shifter BC-484 of Bicron, USA. This plastic wavelength shifter is capable of adequately efficient wavelength conversion of fluorescence from 370 nm to 434 nm. In the example, one wavelength shifter block is sized 5 mm on each side and 2 mm in thickness. Such wavelength shifter blocks are arranged in a planar 10×10 matrix. Two optical fibers 0.5 mm thick are arranged on each of the opposed lateral sides of the horizontal arrays of wavelength shifter blocks and two optical fibers 0.5 mm thick are also arranged on each of the opposed lateral sides of the vertical arrays. Provided on the top surfaces of the wavelength shifter blocks is a fluorescence reflector such as $Al_2O_3$ or MgO which are conventionally used to reflect fluorescence toward the bottom surfaces of the wavelength shifter blocks. In Example 17, the radiation detecting mediums are placed on the top surfaces of the wavelength shifter blocks but they may be placed on the bottom or on both top and bottom surfaces. One wavelength shifter block having the above-described structure constitutes one detection pixel.

Using the above-described optical fiber bundles placed on the lateral sides of both horizontal and vertical arrays of wavelength shifter blocks, one can detect the fluorescence generated upon stimulation with the radiation entering the detection pixels, whereby a two-dimensional radiation image is produced. The optical fibers may typically be Y-7 or Y-11 of Kuraray, Japan which is a wavelength shifting fiber having sensitivity at the wavelength of 434 nm.

EXAMPLE 18

Figure 21:
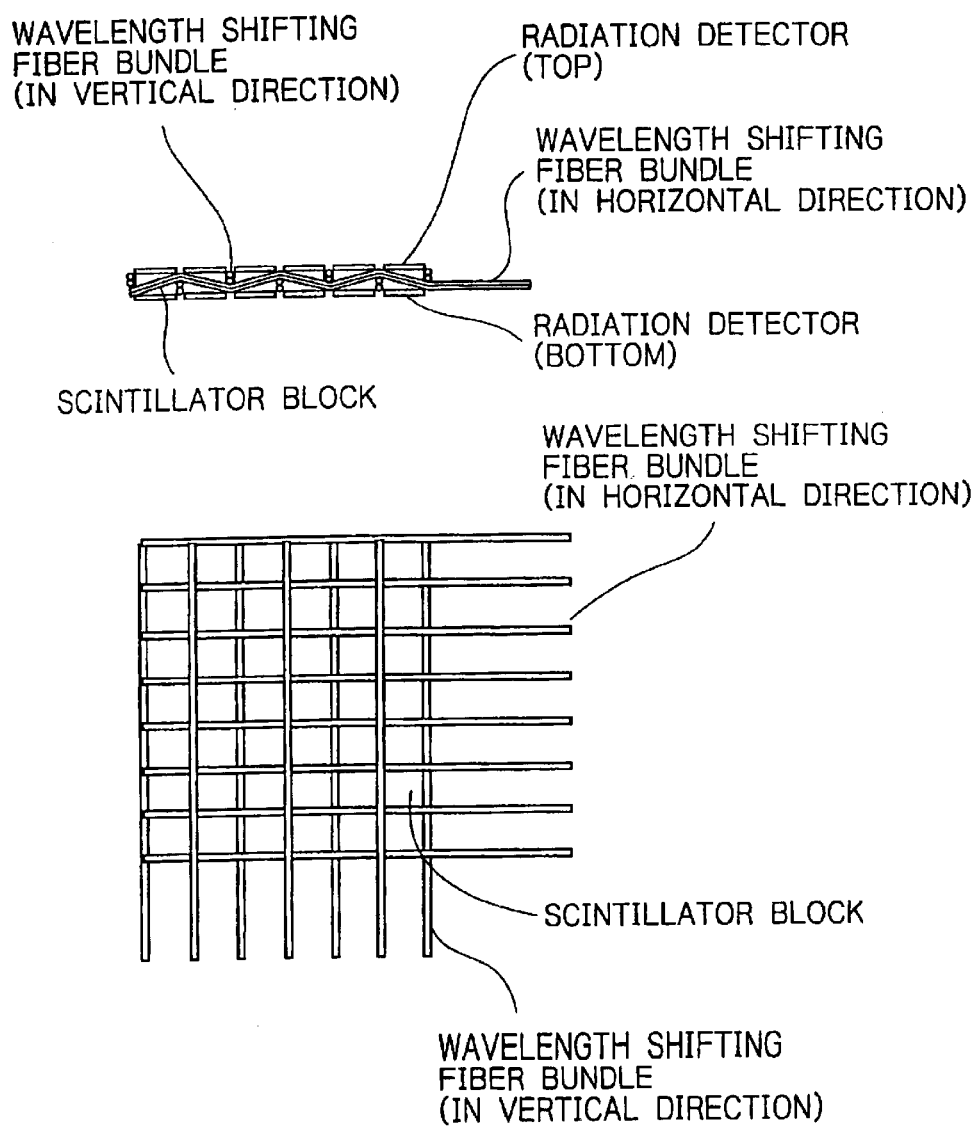
FIG. 21 shows another example in which bundles of wavelength shifting fibers are arranged on opposed lateral sides of the vertical and horizontal arrays of rectangular blocks such that every other bundle of wavelength shifting fibers in the vertical direction passes either over or under bundles of wavelength shifting fibers in the horizontal direction.

A two-dimensional radiation image detector according to Example 18 of the invention is described below with reference to FIG. 21. This embodiment is the same as Examples 15–17 except that optical fiber bundles are arranged on opposed lateral sides of both vertical and horizontal arrays of rectangular scintillator blocks, fluorescence collecting blocks or wavelength shifter blocks such that every other optical fiber bundle in the vertical direction passes either over or under optical fiber bundles in the horizontal direction as shown in FIG. 21. By detecting the fluorescence generated upon stimulation with the radiation launched into the detection pixels, a two-dimensional radiation image can be obtained. This design contributes to enhancing the efficiency of fluorescence detection with the optical fiber bundles.

EXAMPLE 19

Figure 22:
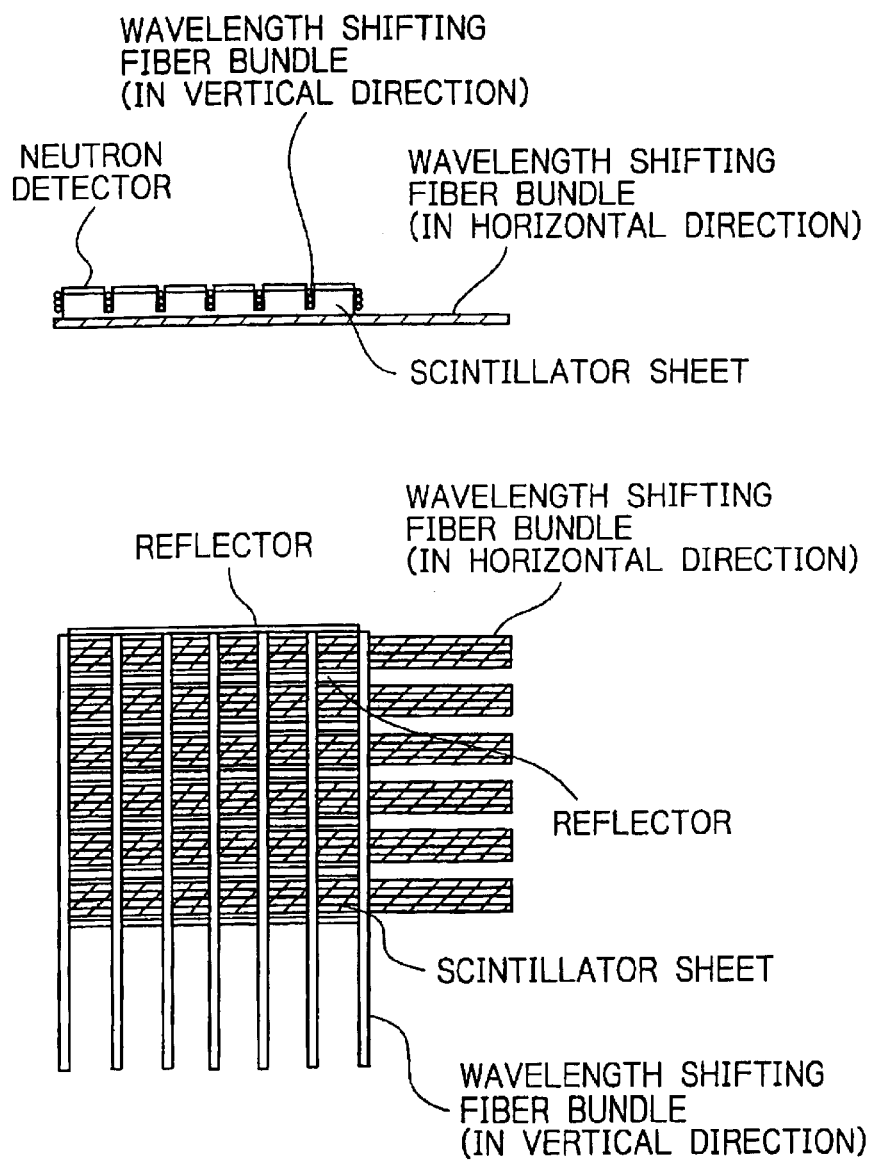
FIG. 22 shows another exemplary two-dimensional neutron image detector that uses a neutron converter containing scintillator sheet as a substrate and which produces a two-dimensional neutron image by detecting the fluorescence from radiation detecting mediums on the top surface of the scintillator sheet and from the scintillator using bundles of wavelength shifting fibers placed in grooves formed in the top surface of the scintillator sheet in a vertical direction and bundles of wavelength shifting fibers arranged on the bottom surface of the scintillator sheet.

A two-dimensional neutron image detector according to Example 19 of the invention is described below with reference to FIG. 22. This embodiment is the same as Examples 5–18 except that the scintillator contains at least one neutron converter element selected from among $^6$Li, $^{10}$B and Gd and that the neutron detecting medium is a material that contains at least one neutron converter element selected from among $^6$Li, $^{10}$B and Gd. By using these materials, a two-dimensional neutron image can be obtained.

We now describe the case of adopting Example 6 as a basis. In this embodiment, a $^6$Li glass scintillator containing the neutron converter $^6$Li is used as the substrate of the two-dimensional neutron image detecting medium. As such glass scintillator, GS20 can be used; this is the $^6$Li glass scintillator of Bicron, USA with a $^6$Li content of 6.6%. It emits fluorescence with a life of 60 ns at a wavelength of 390 nm. In the example, the scintillator sheet is sized 200 mm on each side and 2 mm in thickness. Using a diamond cutter or the like, grooves 0.6 mm wide and 1.5 mm deep are formed in the scintillator sheet at a spacing of 5 mm in both the horizontal and vertical directions. Three optical fibers 0.5 mm thick are placed in each vertical groove and a conventionally used fluorescence reflector such as $Al_2O_3$ or MgO is buried in the horizontal grooves to make up detection pixels separated by the horizontal and vertical grooves. A suitable neutron detecting medium that can be used has the neutron converter $^6$LiF mixed in the powder of $YAlO_3$:Ce which emits fluorescence at a wavelength of 370 nm almost the same as 390 nm at which the $^6$Li glass scintillator emits fluorescence. One neutron-sensitive scintillator having the above-described structure constitutes a detection pixel.

The optical fiber bundles placed in the vertical grooves as combined with optical fiber bundles each consisting of 10 optical fibers 0.5 mm thick that are arranged on the top surface or surfaces of the scintillator sheet are used to detect the fluorescence generated upon stimulation with neutrons entering the detection pixels and the fluorescence generated upon stimulation with neutrons entering the neutron detecting medium or mediums; as a result, a two-dimensional neutron image can be produced with high efficiency. An exemplary optical fiber that can be used is BCF-99-XX which is a tailor-made wavelength shifting fiber having sensitivity in the wavelength range of 370 nm–390 nm.

EXAMPLE 20

Figure 23:
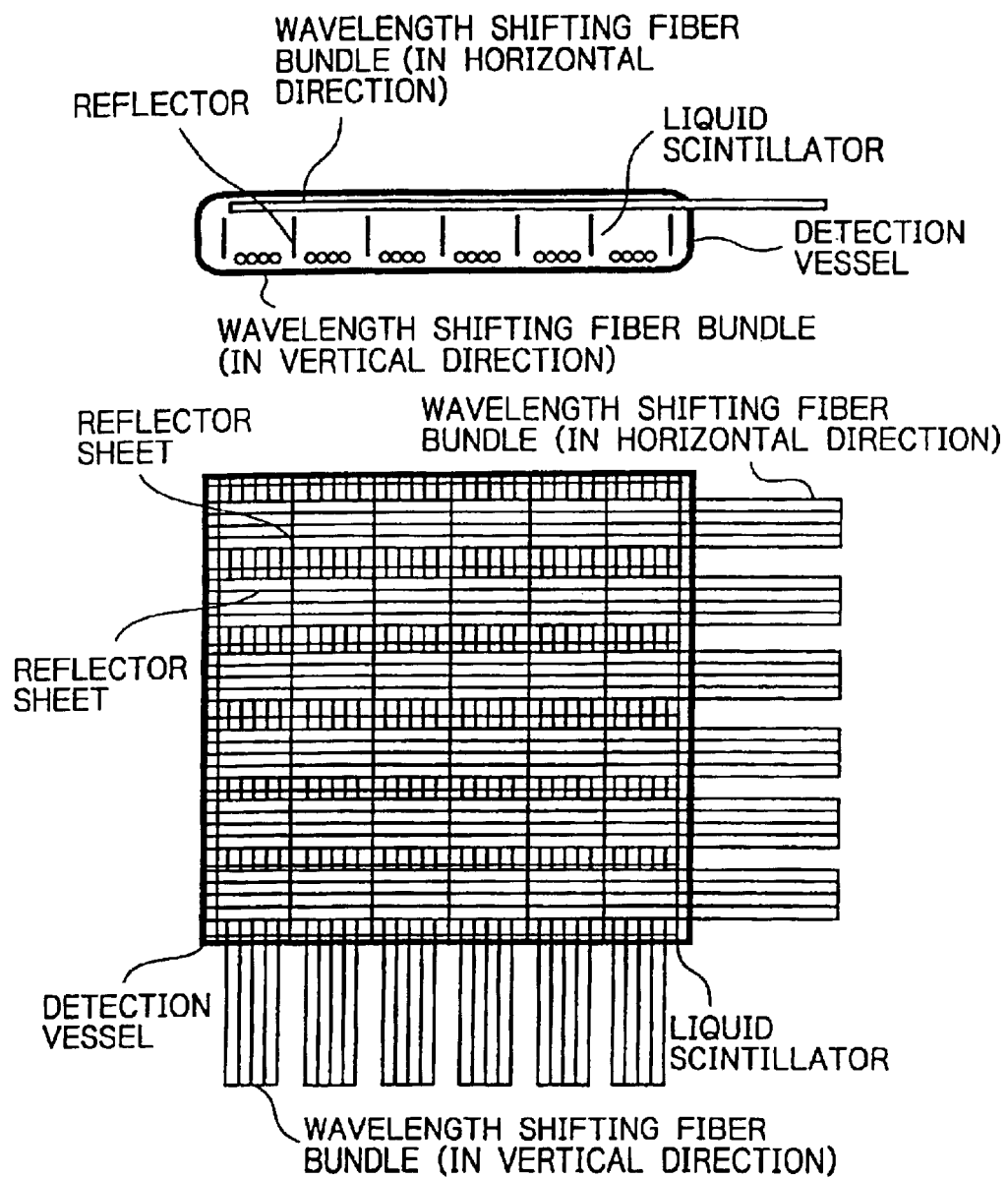
FIG. 23 shows another two-dimensional radiation detector that produces a two-dimensional radiation image by detecting the fluorescence from a grid pattern of liquid scintillator using bundles of wavelength shifting fibers arranged both on top of and under a reflector block in a detection vessel so as to cross each other at right angles, the reflector block being divided into a grid pattern of cells and the detection vessel being filled with the liquid scintillaor.

A two-dimensional radiation image detector according to Example 20 of the invention is described below with reference to FIG. 23. This embodiment is characterized by the following: a liquid scintillator that generates fluorescence upon incidence of a radiation is used as a detection medium; a reflector block that is divided into a grid pattern of cells and which is made of a fluorescence reflecting material is placed within a detection vessel capable of sealing off the liquid scintillator; then, the detection vessel is filled with the liquid scintillator; the fluorescence generated from the liquid scintillator in each reflector cell upon incidence of a radiation is detected with optical fiber bundles that are arranged both on top of and under the reflector block so as to cross each other at right angles, whereby a two-dimensional radiation image is obtained.

In the example, BC-501A of Bicron is used as the liquid scintillator which is the substrate of the two-dimensional radiation image detecting medium. It emits fluorescence with a life of 3.2 ns at a wavelength of 425 nm. In Example 20, the detection vessel capable of sealing off the liquid scintillator has such inside dimensions that it is 10 cm on each side and 4 mm in height. The detection vessel has a rectangular slot made in the upper part of one lateral side in a vertical direction so that an array of wavelength shifting fibers can be inserted through it. The detection vessel has another rectangular slot made in the lower part of another lateral side in a horizontal direction so that another array of wavelength shifting fibers can be inserted through it. The detection vessel can be made of aluminum, stainless steel or the like. The reflector block which is a grid pattern of 5 mm cells has an overall size of 10 cm on each side with a height of 2.8 mm. The reflector block can typically be made of an aluminum sheet with highly polished surfaces. In the example, an array of 200 wavelength shifting fibers 0.5 mm thick are inserted through the rectangular slot in the upper part of one lateral side in the vertical direction and spread across the detection vessel; similarly, another array of 200 wavelength shifting fibers 0.5 mm thick are inserted through the rectangular slot in the lower part of another lateral side in the horizontal direction and spread across the detection vessel. The bundles of wavelength shifting fibers arranged in the upper part of the detection vessel are spaced 3 mm from the bundles of wavelength shifting fibers arranged in the lower part, so when the reflector block is placed within that clear space, five each of the optical fibers in the horizontal and vertical directions detect the fluorescence generated from each of the detection pixels formed of the cells in the reflector block. A suitable optical fiber is BCF-91 of Bicron, USA which is a wavelength shifting fiber sensitive to a wavelength of 425 nm. After filling the detection vessel with the above-mentioned liquid scintillator, the combination of horizontal and vertical optical fiber bundles which correspond to each detection pixel is used to detect the fluorescence generated upon entrance of a radiation into that detection pixel containing the liquid scintillator and, as a result, a two-dimensional radiation image can be obtained. In Example 20, BC-501A of Bicron is used as the liquid scintillator; if desired, BC-551 or BC-553 which are X-ray liquid scintillators doped with lead or tin may be used in accordance with a specific object.

EXAMPLE 21

Figure 24:
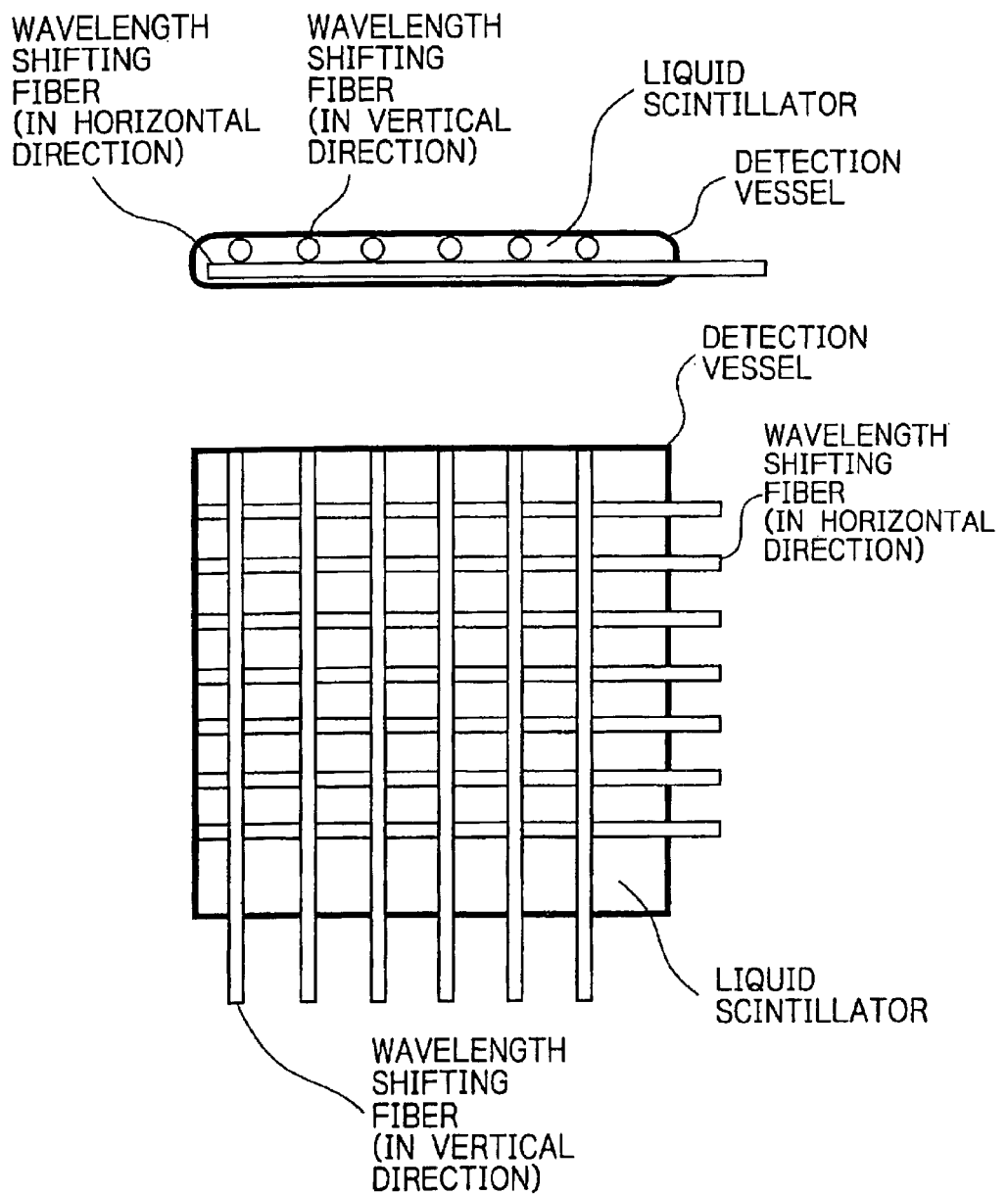
FIG. 24 shows another two-dimensional radiation detector that has one detection block of wavelength shifting fiber bundles arranged in a detection vessel in a grid pattern of cells so as to cross each other at right angles in a vertical and a horizontal direction, said detection block being placed in the direction of the height of the detection vessel which is filled with a liquid scintillator to produce a two-dimensional radiation image by detecting the fluorescence emitted from the liquid scintillator divided into a grid pattern of cells by the detection block.

A two-dimensional radiation image detector according to Example 21 of the invention is described below with reference to FIG. 24. This embodiment is characterized by the following: a liquid scintillator that generates fluorescence upon incidence of a radiation is used as a detection medium; a detection vessel capable of sealing off a liquid scintillator is filled with that liquid scintillator; one or more detecting blocks of optical fiber bundles that are spaced apart and arranged in a grid pattern of cells so as to cross each other at right angles in a vertical and a horizontal direction are superposed in the direction of the thickness of the detection vessel; the fluorescence generated from the liquid scintillator in each cell upon incidence of a radiation is detected with the detecting blocks, whereby a two-dimensional radiation image is obtained.

In the example, BC-501A of Bicron is used as the liquid scintillator which is the substrate of the two-dimensional radiation image detecting medium. It emits fluorescence with a life of 3.2 ns at a wavelength of 425 nm. In Example 21, the detection vessel capable of sealing off the liquid scintillator has such inside dimensions that it is 10 cm on each side and 2 mm in thickness. The detection vessel has rectangular slots made in the upper part of one lateral side in a horizontal direction at an interval of 5 mm to be conformal to the shape of optical fibers so that they can be inserted through the slots. The detection vessel also has rectangular slots made in the lower part of another lateral side in a vertical direction to be conformal to the shape of optical fibers so that they can be inserted through the slots. In the example, wavelength shifting fibers having a square cross section 1 mm on each side are used. The detection vessel can be made of aluminum, stainless steel or the like. In the example, square wavelength shifting fibers 1 mm thick are spaced apart by a distance of 5 mm and inserted through the rectangular slots in the upper part of one lateral side in the horizontal direction and spread across the detection vessel; similarly, square wavelength shifting fibers 1 mm thick are spaced apart by a distance of 5 mm and inserted through the rectangular slots in the lower part of another lateral side in the vertical direction and spread across the detection vessel. A suitable optical fiber is BCF-91 of Bicron, USA which is a wavelength shifting fiber sensitive to a wavelength of 425 nm. After filling the detection vessel with the above-mentioned liquid scintillator, the combination of horizontal and vertical optical fiber bundles which correspond to each detection pixel is used to detect the fluorescence generated upon entrance of a radiation into that detection pixel containing the liquid scintillator and, as a result, a two-dimensional radiation image can be obtained.

EXAMPLE 22

Figure 25:
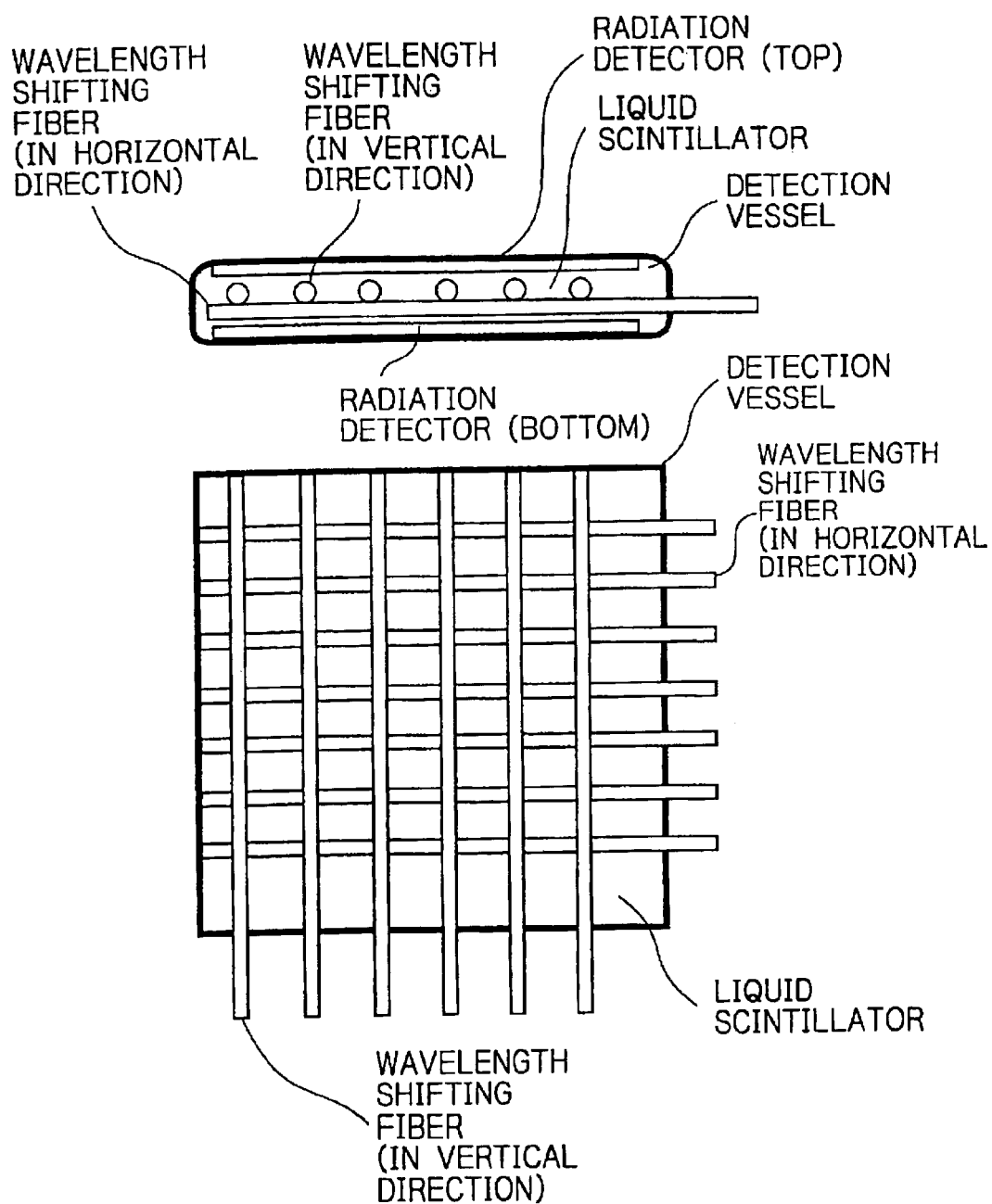
FIG. 25 shows another two-dimensional radiation detector that has one detection block of wavelength shifting fiber bundles arranged in a detection vessel in a grid pattern of cells so as to cross each other at right angles in a vertical and a horizontal direction, said detection block being placed in the direction of the height of the detection vessel which is filled with a liquid scintillator to produce a two-dimensional radiation image by detecting the fluorescence emitted from radiation detecting mediums placed within the detection vessel on both top and bottom surfaces and from the liquid scintillator, both said detection vessel and said liquid scintillator being divided into a grid pattern of cells by the detection block.

A two-dimensional radiation image detector according to Example 22 of the invention is described below with reference to FIG. 25. This embodiment is the same as Example 21 except in the following points: a radiation detecting medium which generates fluorescence upon incidence of a radiation is placed in either the upper part or the lower part or both upper and lower parts of the detection vessel capable of holding the liquid scintillator and the fluorescence emitted from the radiation detecting medium or mediums and the fluorescence emitted from the liquid scintillator in each cell upon entrance of a radiation are detected with optical fiber bundles to produce a two-dimensional radiation image.

In the example, BC-501A of Bicron is used as the liquid scintillator which is the substrate of the two-dimensional radiation image detecting medium. It emits fluorescence with a life of 3.2 ns at a wavelength of 425 nm. In Example 22, the detection vessel capable of sealing off the liquid scintillator has such inside dimensions that it is 10 cm on each side and 2.6 mm in height. In the example, the radiation detecting medium that generates fluorescence upon incidence of a radiation is placed within the detection vessel on both top and bottom surfaces. As the radiation detecting medium, $Y_2SiO_5$:Ce is used and this is a phosphor that emits fluorescence at a wavelength of 410 nm which is almost the same as the wavelength at which the liquid scintillator emits fluorescence. This phosphor is placed in a thickness of 200 µm on the inner surfaces of the detection vessel on both top and bottom. The detection vessel has rectangular slots made in the upper part of one lateral side in a horizontal direction in positions 300 µm below the inner top surface; since these slots are formed at an interval of 5 mm and conformal to the shape of optical fibers, they can be inserted through the slots. The detection vessel also has rectangular slots made in the lower part of another lateral side in a vertical direction in positions 300 µm above the inner bottom surface; since these slots are also formed at an interval of 5 mm and conformal to the shape of optical fibers, they can be inserted through the slots. In the example, wavelength shifting fibers having a square cross section 1 mm on each side are used. The detection vessel can be made of aluminum, stainless steel or the like. In the example, square wavelength shifting fibers 1 mm thick are spaced apart by a distance of 5 mm and inserted through the rectangular slots in the upper part of one lateral side in the horizontal direction and spread across the detection vessel; similarly, square wavelength shifting fibers 1 mm thick are spaced apart by a distance of 5 mm and inserted through the rectangular slots in the lower part of another lateral side in the vertical direction and spread across the detection vessel. A suitable optical fiber is BCF-91 of Bicron, USA which is a wavelength shifting fiber sensitive to a wavelength of 425 nm. After filling the detection vessel with the above-mentioned liquid scintillator, the combination of horizontal and vertical optical fiber bundles which correspond to each detection pixel is used to detect the fluorescence emitted from the radiation detecting mediums placed on the inner top and bottom surfaces of the detection vessel and the fluorescence generated upon entrance of a radiation into that detection pixel containing the liquid scintillator and, as a result, a two-dimensional radiation image can be obtained.

EXAMPLE 23

Figure 26:
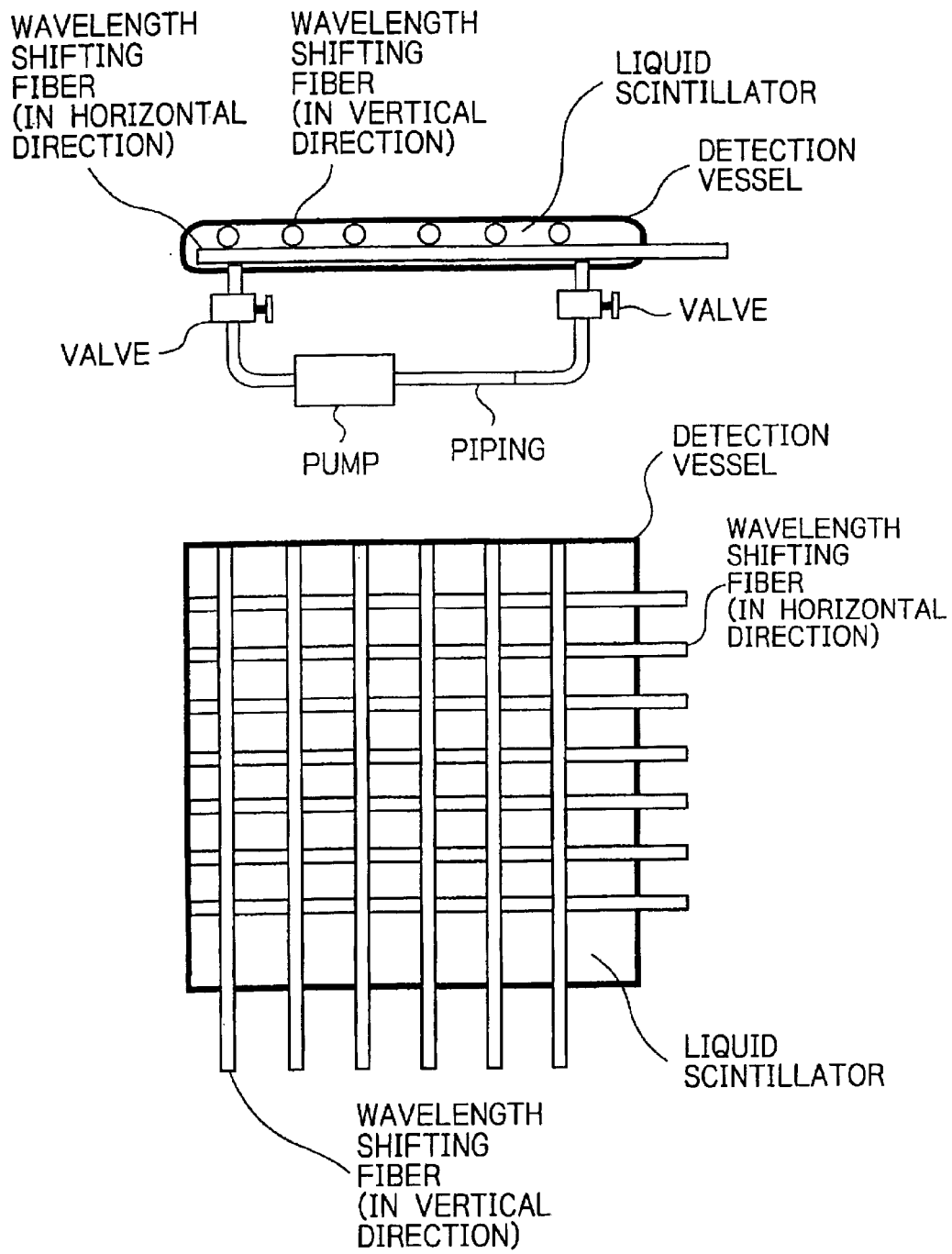
FIG. 26 shows an exemplary two-dimensional radiation image detector of such a structure that a detection vessel filled with a liquid scintillator is equipped with a liquid scintillator circulating mechanism composed of valves, piping and a pump.

A two-dimensional radiation image detector according to Example 23 of the invention is described below with reference to FIG. 26. The two-dimensional radiation image detector of this example is the same as those of Examples 20–22 except that the detection vessel capable of holding the liquid scintillator is equipped with a liquid scintillator circulating mechanism comprising at least valves, piping and a pump. If exposed to a large dose of radiation, the liquid scintillator will emit a reduced amount of fluorescence due to radiation damage. In addition, the incident radiation is not uniform enough to ensure uniform detection sensitivity. In cases like these, the pump is actuated to circulate the liquid scintillator, thereby assuring uniformity in detection sensitivity or preventing its deterioration. Needless to say, the two-dimensional radiation image detector with the design of Example 23 can be readily replaced if its performance is completely deteriorated.

EXAMPLE 24

Figure 27:
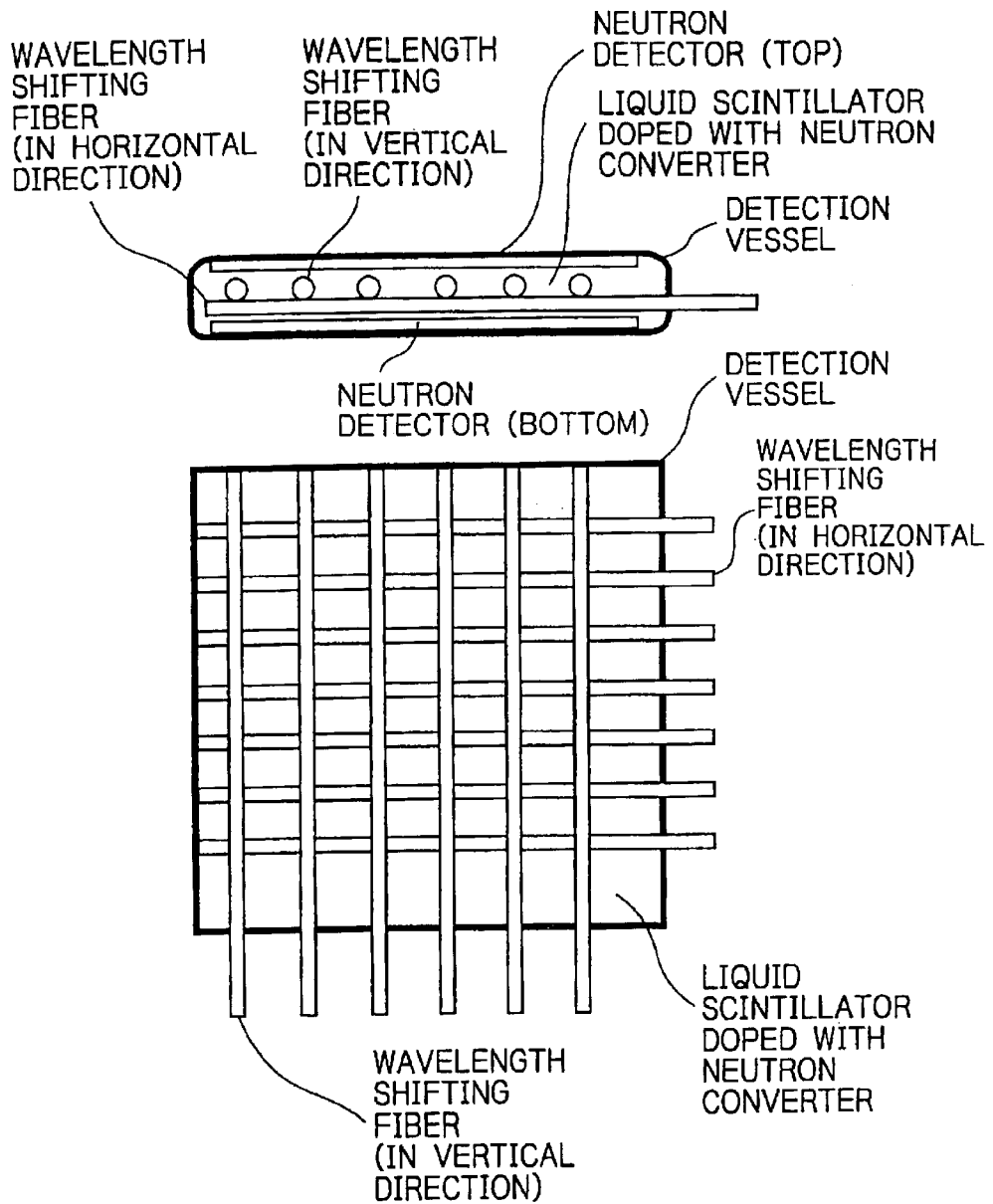
FIG. 27 shows another two-dimensional neutron detector that has one detection block of wavelength shifting fiber bundles arranged in a detection vessel in a grid pattern of cells so as to cross each other at right angles in a vertical and a horizontal direction, said detection block being placed in the direction of the height of the detection vessel which is filled with a neutron converter containing liquid scintillator to produce a two-dimensional neutron image by detecting the fluorescence emitted from neutron detecting mediums placed within the detection vessel on both top and bottom surfaces and from the liquid scintillator, both said detection vessel and said liquid scintillator being divided into a grid pattern of cells by the detection block.

A two-dimensional neutron image detector according to Example 24 of the invention is described below with reference to FIG. 27. The two-dimensional neutron image detector of this example is the same as the two-dimensional radiation detectors of Examples 20–23 except in the following points: the liquid scintillator is mixed with a material that contains at least one neutron converter element selected from among $^6$Li, $^{10}$B and Gd and if the liquid scintillator is to be combined with the radiation detecting medium, the latter is mixed with a material that contains at least one neutron converter element selected from among $^6$Li, $^{10}$B and Gd. Using these materials, the detector can produce a two-dimensional neutron image.

The following description assumes the production of a two-dimensional neutron image on the basis of Example 22. The liquid scintillator used as the substrate of the neutron detecting medium is BC-521 of Bicron, which contains 1% of the neutron converter Gd and emits fluorescence with a life of 4 ns at a wavelength of 425 nm. In Example 24, the detection vessel capable of sealing off the liquid scintillator has such inside dimensions that it is 10 cm on each side and 2.6 mm in height. In the example, the radiation detecting medium that generates fluorescence upon incidence of a radiation is placed within the detection vessel on both top and bottom surfaces. As the neutron detecting medium, a mixture of $Y_2SiO_5$:Ce with $^6$LiF is used; $Y_2SiO_5$:Ce is a phosphor that emits fluorescence at a wavelength of 410 nm which is almost the same as the wavelength at which the liquid scintillator emits fluorescence. This neutron detecting medium is placed in a thickness of 200 μm on the inner surfaces of the detection vessel on both top and bottom.

The detection vessel has rectangular slots made in the upper part of one lateral side in a horizontal direction in positions 300 μm below the inner top surface; since these slots are formed at an interval of 5 mm and conformal to the shape of optical fibers, they can be inserted through the slots. The detection vessel also has rectangular slots made in the lower part of another lateral side in a vertical direction in positions 300 μm above the inner bottom surface; since these slots are also formed at an interval of 5 mm and conformal to the shape of optical fibers, they can be inserted through the slots. In the example, wavelength shifting fibers having a square cross section 1 mm on each side are used. The detection vessel can be made of aluminum, stainless steel or the like. In the example, square wavelength shifting fibers 1 mm thick are spaced apart by a distance of 5 mm and inserted through the rectangular slots in the upper part of one lateral side in the horizontal direction and spread across the detection vessel; similarly, square wavelength shifting fibers 1 mm thick are spaced apart by a distance of 5 mm and inserted through the rectangular slots in the lower part of another lateral side in the vertical direction and spread across the detection vessel. A suitable optical fiber is BCF-91 of Bicron, USA which is a wavelength shifting fiber sensitive to a wavelength of 425 nm. After filling the detection vessel with the above-mentioned liquid scintillator, the combination of horizontal and vertical optical fiber bundles which correspond to each detection pixel is used to detect the fluorescence emitted from the radiation detecting mediums placed on the inner top and bottom surfaces of the detection vessel and the fluorescence generated upon entrance of a radiation into that detection pixel containing the liquid scintillator and, as a result, a two-dimensional radiation image can be obtained. With this design, neutron converters whose neutron capture cross section depends on the energy of neutrons by varying degrees can be contained in the neutron detecting medium to provide better uniformity in sensitivity to the energy of neutrons.

In Example 24, BC-521 of Bicron is used as the liquid scintillator which serves as the substrate of the neutron detecting medium; if desired, this may be replaced by BC-523 or BC-523A which contain B or $^{10}$B as a dopant.

EXAMPLE 25

Figure 28:
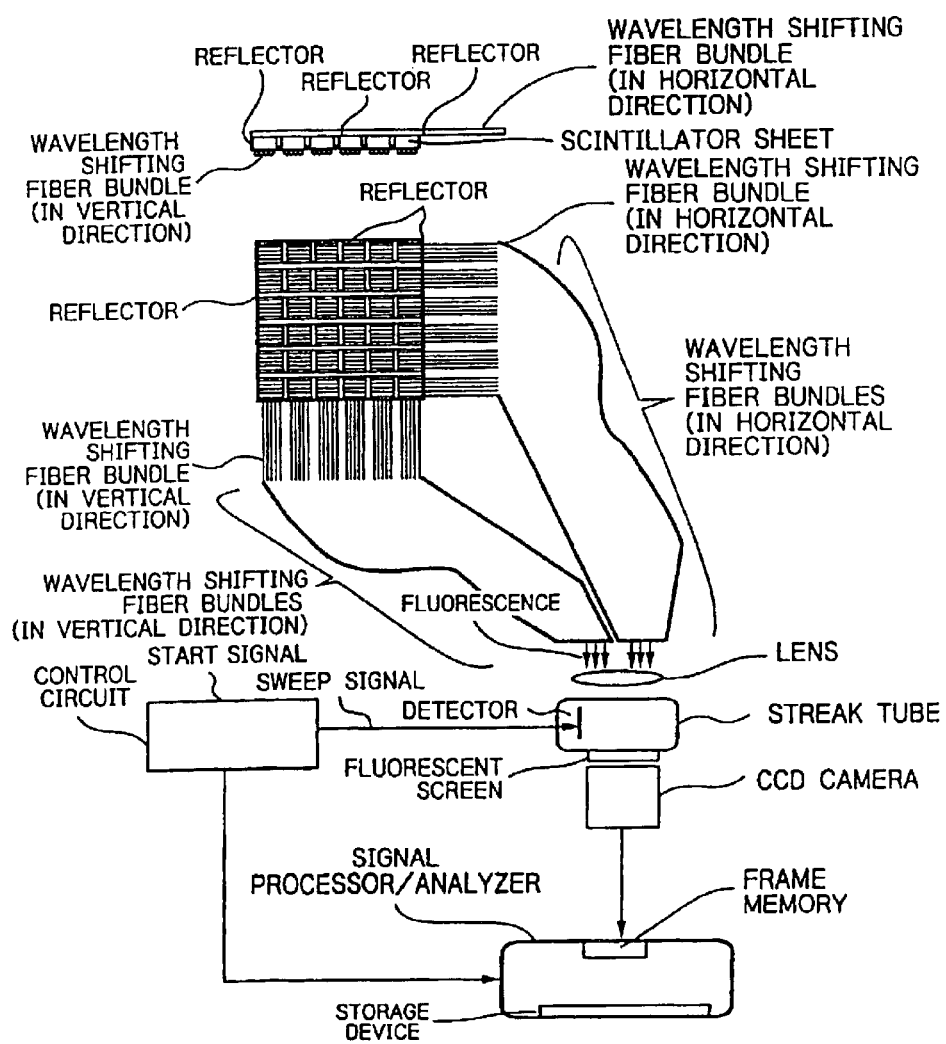
FIG. 28 shows another example in which a streak tube is used as a fluorescence detector in a two-dimensional radiation image detector that uses a scintillator sheet as a substrate and which is composed of a group of detection pixels created in the substrate by dividing it with a fluorescence reflecting material buried in grooves formed in its top surface in both a horizontal and a vertical direction.

A two-dimensional radiation or neutron image detector according to Example 25 of the invention is described below with reference to FIG. 28. This embodiment is the same as Examples 1–24 except in the following points: a streak tube is used as the photodetector which detects the fluorescence being emitted from the optical fiber bundles and the time-series data for the emitted fluorescence as detected with the streak tube is analyzed by the simultaneous counting method to acquire a two-dimensional radiation or neutron image. The following description assumes the production of the intended image on the basis of Example 1.

An exemplary scintillator sheet that can be used in Example 25 is the plastic scintillator BC-414 of Bicron, USA which has heretofore been used as a medium for detecting ionizing radiations such as X- or α-rays. This scintillator emits fluorescence with a life of 1.8 ns at a wavelength of 392 nm. In the example, the scintillator sheet is sized 100 mm on each side and 2 mm in thickness. Grooves 0.5 mm wide and 1.5 mm deep are formed in the scintillator sheet at a spacing of 2 mm in both a horizontal and a vertical direction. A conventionally used fluorescence reflector such as $Al_2O_3$ or MgO is buried in the grooves to make up a group of detection pixels separated by the horizontal and vertical grooves.

As in the prior art, optical fiber bundles are placed on both surfaces of the two-dimensional radiation image detecting medium, the bundles on the top surface in the X-direction and those on the bottom surface in the Y-direction so that they are arranged in a grid pattern, and the simultaneous counting method is applied to the fluorescence entering the detection pixels after being generated by stimulation with a radiation. In this way, the two-dimensional radiation image detector of the embodiment under consideration is fabricated. The optical fiber bundles may be composed of wavelength shifting fiber BCF-92 of Bicron which matches the fluorescence wavelength of the plastic scintillator BC-414. After aligning the bundles of wavelength shifting optical fibers side by side in both the X- and Y-directions, the width of the fluorescence emerging from the optical fiber bundles in each direction is passed through optics such as lens so that it is adjusted to a value at which the streak tube is sensitive. The streak camera should be of a type having the widest possible sensitive zone and a suitable example is C7700 of Hamamatsu Photonics which has a sensitive length of 18 mm. The wavelength-shifted fluorescence signal that has been input to the sensitive zone of the streak tube after size reduction with lens and other optics is detected as sweeping is done by the deflecting field in the streak tube at time intervals determined by the control circuit for a time period corresponding to the vertical width of the streak tube. If the plastic scintillator BC-414 is used as the radiation detecting medium, it emits fluorescence at a wavelength of 1.8 ns, so a time period of 10 ns which is about five times as long as this value is determined as the temporal resolution. By setting a time period several times as long as the fluorescence life, almost all of the fluorescence that has been generated upon incidence of a radiation can be integrated for detection. After sweeping for the time period corresponding to the vertical width of the streak tube, a streak image can be obtained on the phosphor screen of the streak tube. The streak image is captured with a pickup camera which is typically a CCD camera capable of detecting 1000×1000 pixels. Since the number of pixels on the vertical axis of the CCD camera is 1000, the effective sweep time is 10 μs (=10 ns×1000). The picture signals from the CCD camera are digitized with a signal processor/analyzer to produce time-series data for the two groups of optical fibers, which is then stored in the storage device in the signal processor/analyzer.

The stored time-series data for signal intensity of the light emitted from the two groups of optical fibers are analyzed by the signal processor/analyzer. There are two methods of analysis. In one method, analysis is performed by a photon counting mode in which photon incidence is assumed when a particular signal intensity of light emission is greater than a preset value and the position of simultaneous photon incidence in both a horizontal and a vertical direction is described as the position in which the incident radiation was launched. In the other method, signal intensities of light emission are analyzed at two or more stages so that analysis can be done even if two or more radiations are launched simultaneously into detection pixels in a horizontal or vertical direction. This mode requires prolonged analysis. In the example under consideration, the temporal resolution for simultaneous counting is 10 ns so that position can be specified by comparing two consecutive pixels.

The use of a streak tube thus facilitates fast multi-channel detection of two-dimensional optical image and if it is combined with a two-dimensional radiation or neutron image detector, particularly effective use is found in studies that require high count-rate processing to be done in a short time by applying the flight time method or the like.

EXAMPLE 26

A two-dimensional radiation image detector according to Example 26 of the invention is described below with reference to FIG. 29. The image detector of this example is a two-dimensional radiation or neutron image detector which uses a scintillator, a liquid scintillator or a phosphor as a detection medium and which determines the incident position of a radiation or neutron by detecting the fluorescence from the detection medium with a grid pattern of crossed optical fiber bundles in a horizontal and a vertical direction. In order to construct a radiation image on the basis of the photon detection signals as output for both horizontal and vertical directions by performing photon detection on the fluorescence from the horizontal and vertical optical fiber bundles with a photodetector and a peak height discriminator, pulse signals whose time duration is determined on the basis of the Poisson distribution in correspondence with the fluorescence life of the detection medium (scintillator, liquid scintillator or phosphor) are generated from a retriggerable pulse signal generator that generates retriggerable pulses in response to a timing pulse signal output from the peak height discriminator and these pulse signals are used to acquire a two-dimensional radiation or neutron image.

Figure 29:
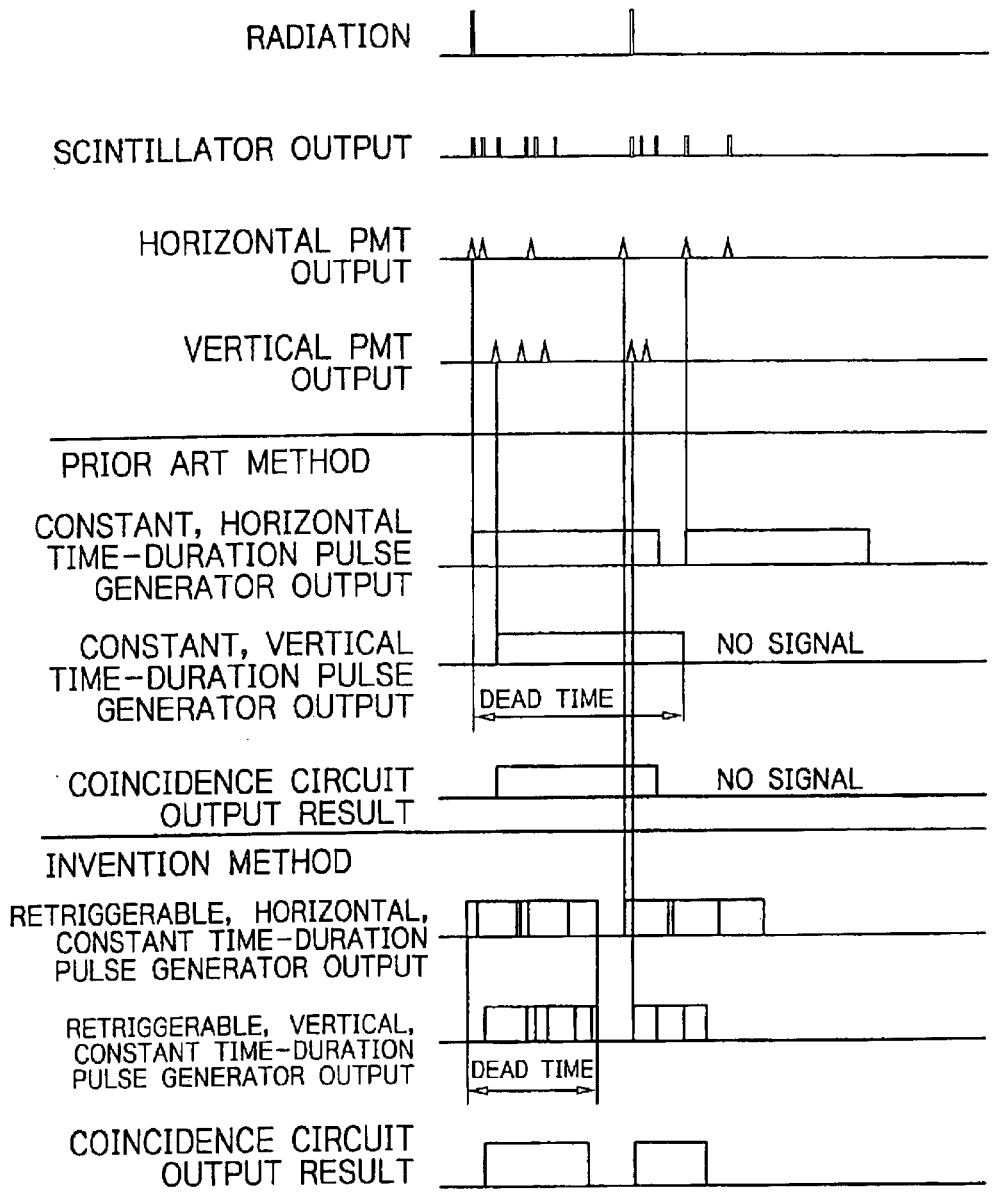
FIG. 29 shows a method in which pulse signals whose time duration is determined on the basis of the Poisson distribution are generated from the retriggerable pulse signal generator of the invention, as compared with the method of generating pulses of a constant time duration with a conventional pulse generator.

As shown in FIG. 29, the image detector of Example 26 is such that when constructing a radiation image on the basis of PMT (photomultiplier tube) output signals for the horizontal and vertical directions that have been created on the basis of the fluorescence generated in the scintillator, pulse signals whose time duration is determined on the basis of the Poisson distribution in correspondence with the fluorescence life of the detection medium are generated using a retriggerable pulse signal generator that generates retriggerable pulses in response to a timing signal output from the peak height discriminator (not shown). Using the generated, retrigerrable output signals of constant time duration from the pulse generator for both horizontal and vertical directions, the coincidence circuit performs simultaneous counting and a two-dimensional radiation image is determined on the basis of the output from the coincidence circuit. In this case, the most efficient simultaneous counting is possible by setting the time duration of retriggerable pulses to be almost equal to the lifetime of fluorescence.

In the conventional method, the efficiency of simultaneous counting is increased by setting the time duration of retriggerable pulses to a value at least twice as long as the lifetime of fluorescence. Thus, compared to the case of generating pulses of constant time duration in the conventional method, the present invention permits the use of shorter pulses to increase the count rate in simultaneous counting. If the time duration of retriggerable pulses is 80 ns or more, a generator of retriggerable pulses of constant time duration can be easily fabricated by using a retriggerable pulse generator device such as SN74122 or SN74123 which are commercially available TTL integrated circuit devices.

EXAMPLE 27

Figure 30:
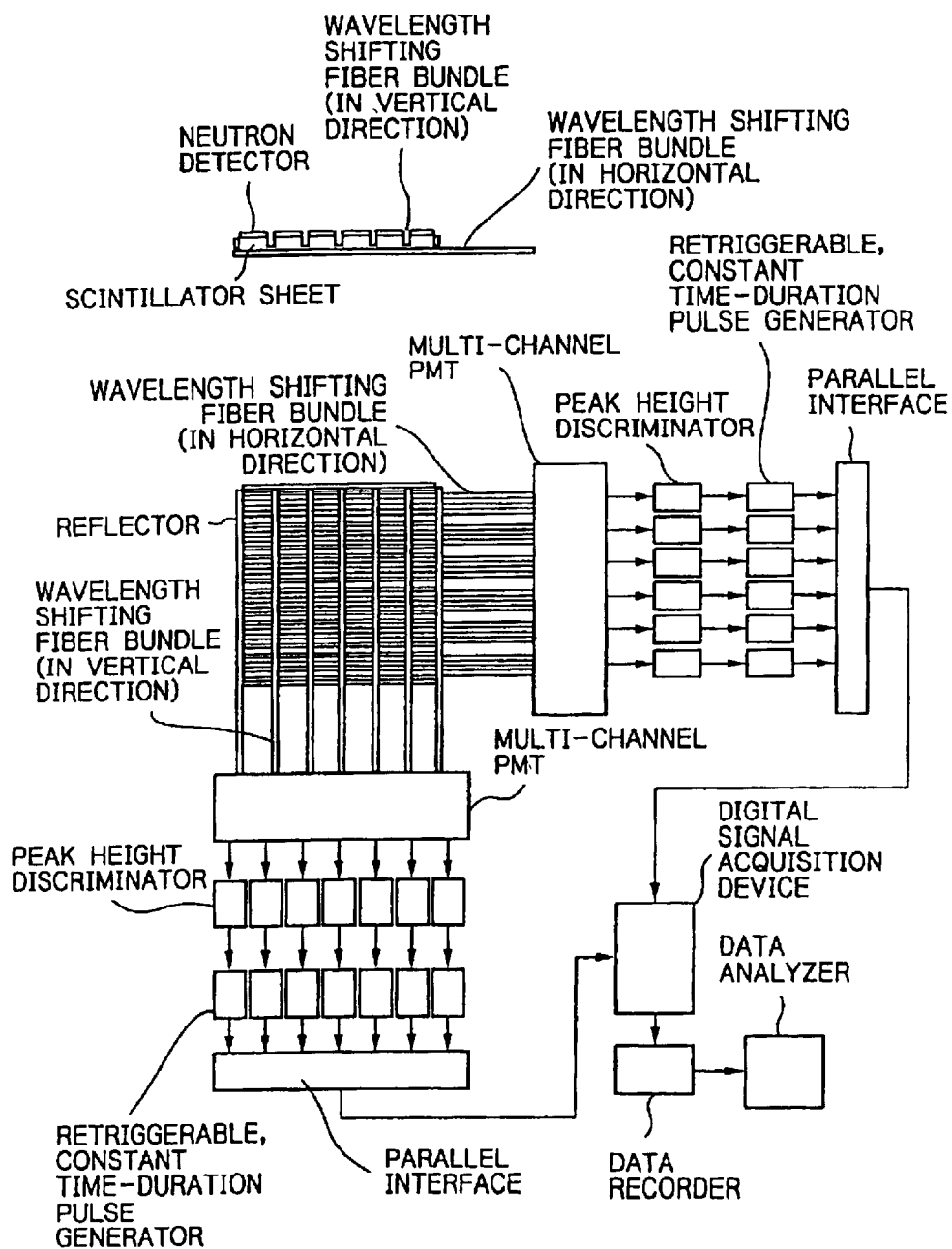
FIG. 30 shows another exemplary two-dimensional neutron image detector that uses a neutron converter containing scintillator sheet as a substrate and in which the pulse signals generated on the basis of the fluorescence from neutron detecting mediums on the top surface of the scintillator sheet and from the scintillator using bundles of wavelength shifting fibers placed in grooves formed in the top surface of the scintillator sheet in a vertical direction and bundles of wavelength shifting fibers arranged on the bottom surface of the scintillator sheet are recorded as time-base signals with parallel-signal input circuits and a signal recorder/analyzer and analyzed by the simultaneous counting method to produce a two-dimensional neutron image.
Figure 31:
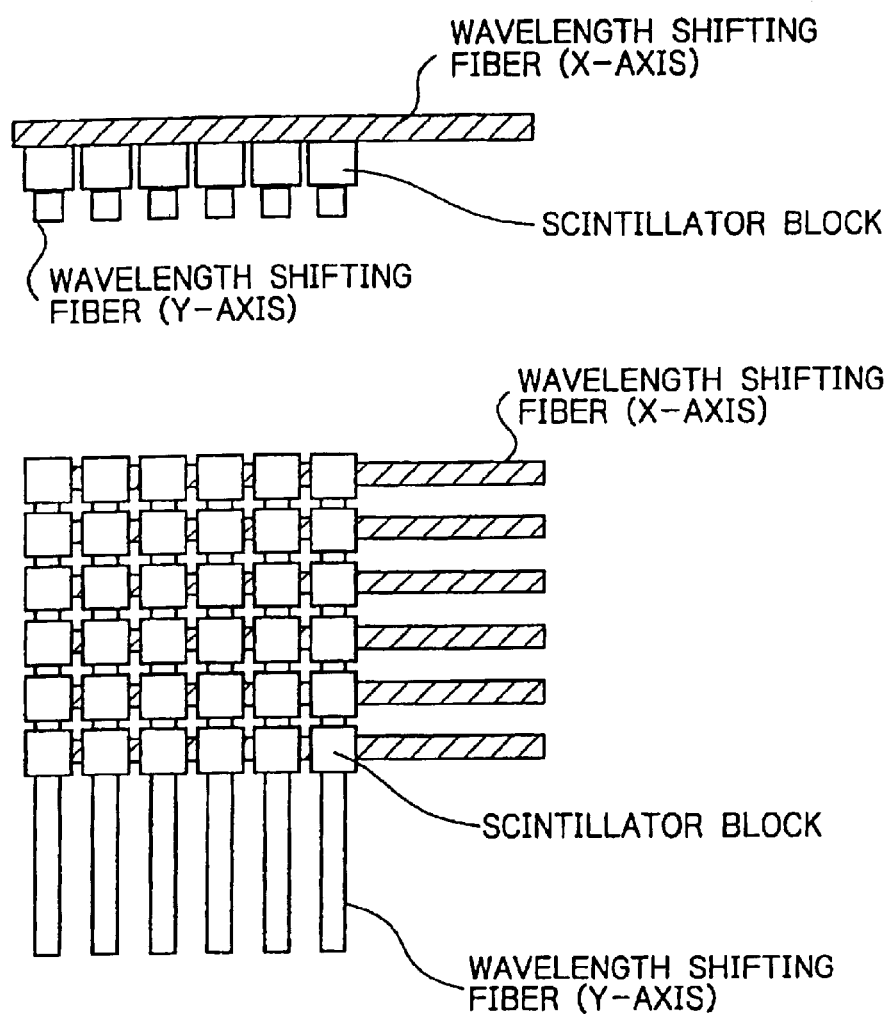
FIG. 31 shows a conventional two-dimensional radiation image detector which produces a two-dimensional radiation image by detecting the fluorescence from scintillator blocks using bundles of wavelength shifting fibers arranged in a vertical direction on the top surfaces of the scintillator blocks and in a horizontal direction on the bottom surfaces thereof.
Figure 32:
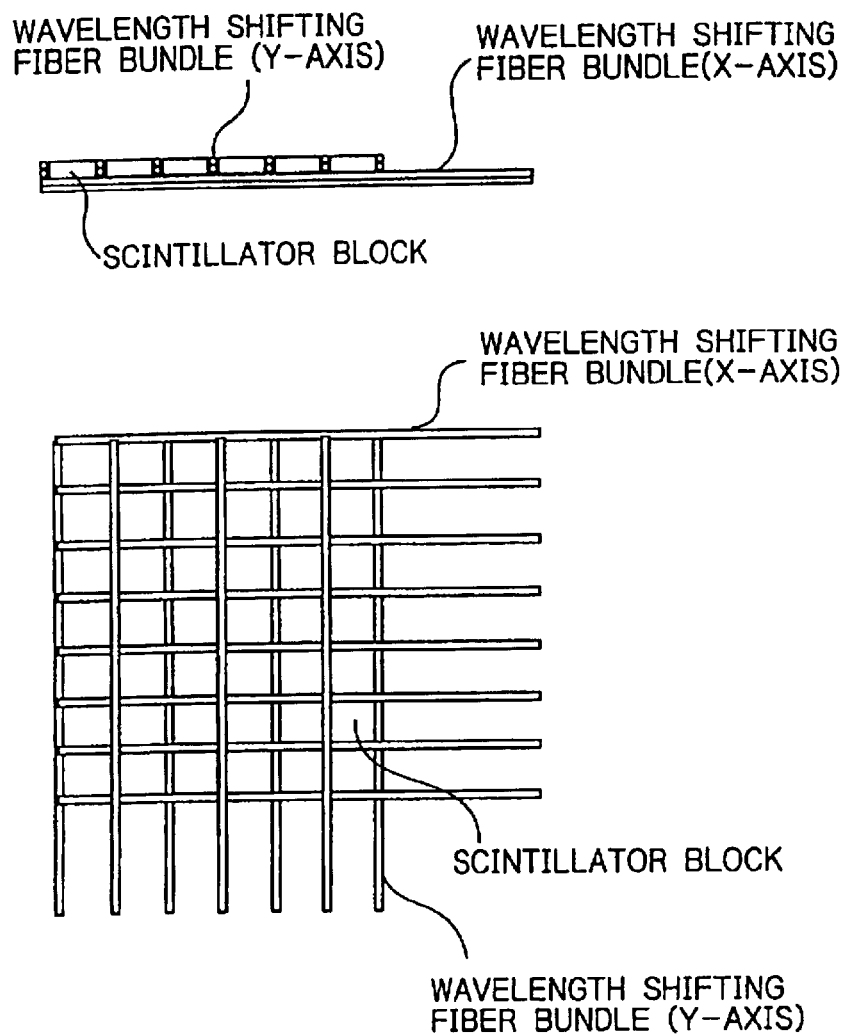
FIG. 32 shows another conventional two-dimensional radiation image detector which produces a two-dimensional radiation image by detecting the fluorescence from scintillator blocks using bundles of wavelength shifting fibers arranged to cross each other at right angles on opposed lateral sides of the vertical and horizontal arrays of scintillator blocks.

A two-dimensional radiation image detector according to Example 27 of the invention is described below with reference to FIG. 30. The image detector of this example is a two-dimensional radiation or neutron image detector which uses a scintillator, a liquid scintillator or a phosphor as a detection medium and which determines the incident position of a radiation or neutron by detecting the fluorescence from the detection medium with a grid pattern of crossed optical fiber bundles in a horizontal and a vertical direction. In order to construct a radiation image on the basis of the photon detection signals as output for both horizontal and vertical directions by performing photon detection on the fluorescence from the horizontal and vertical optical fiber bundles with a photodetector and a peak height discriminator, pulse signals of a predetermined time duration are output from a pulse signal generator or pulse signals whose time duration is determined on the basis of the Poisson distribution are generated from a retriggerable pulse signal generator, both in response to a timing pulse signal output from the peak height discriminator; the pulse signals of either type are recorded as time-series signals with a parallel signal input circuit and a signal recorder/analyzer; the recorded time-series signals are analyzed with the signal recorder/analyzer by the simultaneous counting method to acquire a two-dimensional radiation or neutron image.

The following description assumes that the concept of Example 27 is applied to a two-dimensional neutron image detector which is constructed as in Example 19 to produce a two-dimensional neutron image. The scintillator block shown in FIG. 30 consists of 6×6 cells. In addition, pulse signals whose time duration is determined on the basis of the Poisson distribution are generated from a retriggerable pulse signal generator that generates retriggerable pulses of a constant time duration in response to a timing pulse signal output from the peak height discriminator and these pulse signals are used as coincidence signals to determine the position of incident neutrons.

The fluorescence generated from the scintillator in the two-dimensional neutron image detector is converted to electric signals by means of a multi-channel photomultiplier tube, an example of which is H6568, or a 16-channel photomultiplier tube produced by Hamamatsu Photonics. Using the electric signals, timing pulse signals are generated with those peak height discriminator. On the basis of the timing pulse signals, photon detection signals for both horizontal and vertical directions the time duration of which is determined on the basis of the Poisson distribution in correspondence with the fluorescence life of the detection medium are generated from the retriggerable, constant time-duration pulse signal generator which generates retriggerable pulses of a constant time duration. These signals are passed through parallel interfaces (fast parallel signal input circuits) and captured by a digital signal acquisition device (signal recorder) so that they are recorded in a data recorder. An exemplary parallel interface that can be used is PCI-DIO-32HS, or a 32-channel data recording board available from National Instrument. In FIG. 30, two parallel interfaces are provided separately in the horizontal and vertical directions. If desired, the same processing can be done with a single parallel interface board. PCI-DIO-32HS can record pulse signals as time-series signals at intervals of 100 ns. A two-dimensional radiation or neutron image can be easily produced by analyzing the recorded time-series signals with a data analyzer by the simultaneous counting method illustrated in Example 26.

Being constructed according to the designs described on the foregoing pages, the two-dimensional radiation or neutron image detector of the invention has the following advantages.

Conventionally, it has been troublesome and difficult to produce the two-dimensional radiation image detector using a scintillator since a number of scintillator blocks have to be put in place. According to the invention, a two-dimensional radiation image detector of large area can be produced at low cost using a scintillator sheet of large area.

If a material which is both a fluorescence reflector and a gamma-ray or neutron absorber is placed on lateral sides of a detection medium, a radiation or neutron image detector can be realized that is enhanced in their ability to detect the position of incident gamma-rays or neutrons.

By combining a phosphor with transparent blocks or wavelength shifter blocks or scintillator blocks, one can realize a two-dimensional radiation image detector using a phosphor of a sufficiently large area to provide comparatively large pixels that have been difficult to produce in the prior art.

By adopting a design that permits combined use of a phosphor and a scintillator, one can realize a radiation image detector that is enhanced in detection efficiency or which has many capabilities.

A two-dimensional radiation image detector adapted to high count rates in simultaneous counting on the basis of photon detection signals for both a horizontal and a vertical direction can be realized by using pulse signals generated from a retriggerable pulse signal generator the time duration of which is determined on the basis of the Poisson distribution in correspondence with the fluorescence life of the detection medium.

The above-described radiation image detector using a scintillator or a phosphor may be used in combination with a neutron converter material to realize a two-dimensional neutron image detector.

From the viewpoint of temporal resolution, the scintillator and the phosphor should not be unduly thick and an X-ray image detector or a two-dimensional neutron image detector that best suit this purpose can be fabricated in accordance with the present invention.

What is claimed is:

1. A two-dimensional radiation image detector characterized in that the top surface of a scintillator sheet which generates fluorescence upon incidence of a radiation has grooves cut at predetermined spacings in a horizontal and a vertical direction to a depth at least one half the thickness of the scintillator sheet, with optical fiber bundles being placed in the vertical grooves and a fluorescence reflector buried in the horizontal grooves, that optical fiber bundles are arranged on either the top or the bottom surface of the scintillator sheet or on both surfaces in a transverse direction normal to the optical fiber bundles within the vertical grooves to make a group of detection pixels that are separated by the horizontal and vertical grooves, and that the fluorescence generated by stimulation with the radiation launched into the detection pixels is detected by the optical fiber bundles placed within the vertical grooves in the scintillator sheet and the optical fiber bundles arranged on either the top or the bottom surface of the scintillator sheet or on both surfaces, thereby producing a two-dimensional radiation image, wherein the scintillator contains a neutron converter selected from the group consisting of $^6$Li, $^{10}$B, Gd, and blends thereof, and the reflector contains a material containing an element that has an atomic number of 40 or more is used to isolate radiation between detection pixels.

2. The two-dimensional radiation image detector in accordance with claim 1 which uses a scintillator, a liquid scintillator, or a phosphor as a detection medium and which determines the incident position of a radiation or neutron by detecting the fluorescence from the detection medium with a grid pattern of crossed optical fiber bundles in a horizontal and a vertical direction, characterized in that a photodetector and a peak height discriminator detect photons on the fluorescence from both the horizontal and vertical optical fiber bundles and construct the two-dimensional image, wherein a retriggerable pulse signal generator receives a timing pulse signal output from the peak height discriminator and generates pulse signals having a time duration determined on the basis of the Poisson distribution in correspondence with the fluorescence life of the scintillator, liquid scintillator, or phosphor medium to acquire the two-dimensional radiation image.

3. A two-dimensional radiation image detector characterized in that the top surface of a scintillator sheet which generates fluorescence upon incidence of a radiation has grooves cut at predetermined spacings in a horizontal and a vertical direction to a depth at least one half the thickness of the scintillator sheet, with optical fiber bundles being placed in the vertical grooves and a fluorescence reflector buried in the horizontal grooves, that optical fiber bundles are arranged on the bottom surface of the scintillator sheet in a transverse direction normal to the optical fiber bundles within the vertical grooves and radiation detecting mediums that generate fluorescence by stimulation with a radiation are arranged on the top surface, thereby making detection pixels that are separated by the horizontal and vertical grooves, and that the fluorescence generated by stimulation with the radiation launched into the detection pixels and the fluorescence generated from the radiation detecting mediums are detected by the optical fiber bundles placed within the vertical grooves in the scintillator sheet and the optical fiber bundles arranged on the bottom surface of the scintillator sheet, thereby producing a two-dimensional radiation image, wherein the scintillator contains a neutron converter selected from the group consisting of $^6$Li, $^{10}$B, Gd, and blends thereof, and the reflector contains a material containing an element that has an atomic number of 40 or more is used to isolate radiation between detection pixels.

4. The two-dimensional radiation image detector according to claim 3, wherein the top and bottom surfaces of the scintillator sheet are alternately provided with grooves that are cut at predetermined spacings in a horizontal and a vertical direction to a depth at least one half the thickness of the respective sheets, and a fluorescence reflector is buried in the grooves to make a group of detection pixels that are separated by the horizontal and vertical grooves and which are capable of producing a two-dimensional radiation image.

5. The two-dimensional radiation image detector in accordance with claim 3 which uses a scintillator, a liquid scintillator, or a phosphor as a detection medium and which determines the incident position of a radiation or neutron by detecting the fluorescence from the detection medium with a grid pattern of crossed optical fiber bundles in a horizontal and a vertical direction, characterized in that a photodetector and a peak height discriminator detect photons on the fluorescence from both the horizontal and vertical optical fiber bundles and construct the two-dimensional image, wherein a retriggerable pulse signal generator receives a timing pulse signal output from the peak height discriminator and generates pulse signals having a time duration determined on the basis of the Poisson distribution in correspondence with the fluorescence life of the scintillator, liquid scintillator, or phosphor medium to acquire the two-dimensional radiation image.

* * * * *